US012082177B2

(12) United States Patent
Hmimy et al.

(10) Patent No.: US 12,082,177 B2
(45) Date of Patent: Sep. 3, 2024

(54) METHODS AND APPARATUS FOR INTRA-CELL AND INTER-FREQUENCY MOBILITY OPTIMIZATION AND MITIGATION OF SESSION DISRUPTION IN A QUASI-LICENSED WIRELESS SYSTEM

(71) Applicant: Charter Communications Operating, LLC, St. Louis, MO (US)

(72) Inventors: Hossam Hmimy, Aurora, CO (US); Umamaheswar Kakinada, Carpentersville, IL (US); Maulik Vaidya, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 17/898,250

(22) Filed: Aug. 29, 2022

(65) Prior Publication Data
US 2023/0007655 A1 Jan. 5, 2023

Related U.S. Application Data

(63) Continuation of application No. 15/986,614, filed on May 22, 2018, now Pat. No. 11,432,284.

(51) Int. Cl.
*H04W 72/0453* (2023.01)
(52) U.S. Cl.
CPC .............................. *H04W 72/0453* (2013.01)
(58) Field of Classification Search
None
See application file for complete search history.

(56) References Cited

U.S. PATENT DOCUMENTS

| 5,991,308 A | 11/1999 | Fuhrmann et al. |
| 5,995,499 A | 11/1999 | Hottinen et al. |

(Continued)

FOREIGN PATENT DOCUMENTS

| CA | 2643806 C | 6/2013 |
| EP | 2294860 B1 | 4/2017 |

(Continued)

OTHER PUBLICATIONS

Deering, S., et al., "Internet Protocol, Version 6 (IPv6) Specification," Internet Engineering Task Force (IETF) RFC 2460, Dec. 1998, 39 pages.

(Continued)

*Primary Examiner* — Robert M Morlan
(74) *Attorney, Agent, or Firm* — Patent Beach PC

(57) ABSTRACT

Methods and apparatus for providing quasi-licensed intra-cell spectrum reassignment. In one embodiment, the quasi-licensed spectrum utilizes 3.5 GHz CBRS (Citizens Broadband Radio Service) spectrum, and a "seamless" reassignment of wireless spectrum without disruption or loss of continuity to existing data sessions of the CBSD is provided via a pool of temporary RF carriers which act as substitutes for the currently allocated (granted) carriers. The served user devices (e.g., UEs) are instructed by the CBSD to migrate to a new "final" carrier via the substitutes, either directly or via one or more intermediary hops. In one variant, existing 3GPP signaling mechanisms between the UE and CBSD/eNodeB obviates any changes to extant UEs. Communications between the CBSD and its cognizant SAS/DP include new information objects which direct the CBSD to implement the handover functionality. In a further variant, inter-CBSD sector and frequency handovers are provided for using CBRS-plane and 3GPP signaling.

21 Claims, 20 Drawing Sheets

(56) References Cited

U.S. PATENT DOCUMENTS

| | | |
|---|---|---|
| 6,154,648 A | 11/2000 | Comer |
| 6,356,560 B1 | 3/2002 | Venters et al. |
| 6,771,953 B1 | 8/2004 | Chow et al. |
| 6,782,262 B1 | 8/2004 | Lundborg |
| 7,266,726 B1 | 9/2007 | Ladd et al. |
| 7,592,912 B2 | 9/2009 | Hasek et al. |
| 7,602,820 B2 | 10/2009 | Helms et al. |
| 7,698,606 B2 | 4/2010 | Ladd et al. |
| 8,024,607 B2 | 9/2011 | Ladd et al. |
| 8,046,636 B2 | 10/2011 | Ladd et al. |
| 8,095,610 B2 | 1/2012 | Gould et al. |
| 8,170,065 B2 | 5/2012 | Hasek et al. |
| 8,189,465 B1 | 5/2012 | Pawar et al. |
| 8,218,422 B2 | 7/2012 | Venturino et al. |
| 8,302,111 B2 | 10/2012 | Ladd et al. |
| 8,321,723 B2 | 11/2012 | Ladd et al. |
| 8,799,723 B2 | 8/2014 | Ladd et al. |
| 8,997,136 B2 | 3/2015 | Brooks et al. |
| 9,166,891 B2 | 10/2015 | Hu et al. |
| 9,185,341 B2 | 11/2015 | Hardin |
| 9,213,538 B1 | 12/2015 | Ladd et al. |
| 9,258,809 B2 | 2/2016 | Liao et al. |
| 9,300,445 B2 | 3/2016 | Hardin |
| 9,386,496 B2 | 7/2016 | Gupta et al. |
| 9,413,651 B2 | 8/2016 | Tsym et al. |
| 9,414,111 B2 | 8/2016 | Hasek et al. |
| 9,472,091 B2 | 10/2016 | Stern et al. |
| 9,473,957 B2 | 10/2016 | Wellington |
| 9,526,056 B2 | 12/2016 | Tomici et al. |
| 9,564,932 B1 | 2/2017 | Pack et al. |
| 9,591,491 B2 | 3/2017 | Tapia et al. |
| 9,612,816 B2 | 4/2017 | Choi et al. |
| 9,654,149 B2 | 5/2017 | Piipponen et al. |
| 9,699,663 B1 | 7/2017 | Jovancevic |
| 9,730,135 B1 | 8/2017 | Rahman |
| 9,730,143 B2 | 8/2017 | Gormley et al. |
| 9,769,692 B2 | 9/2017 | Freda et al. |
| 9,807,778 B2 | 10/2017 | Ma et al. |
| 9,813,148 B2 | 11/2017 | Syed et al. |
| 9,887,864 B1 | 2/2018 | Han et al. |
| 10,098,568 B2 | 10/2018 | Gazdzinski |
| 10,135,730 B2 | 11/2018 | Chou |
| 10,340,976 B2 | 7/2019 | Kakinada et al. |
| 10,405,192 B2 | 9/2019 | Kakinada et al. |
| 10,484,876 B2 | 11/2019 | Shah et al. |
| 10,492,204 B2 | 11/2019 | Kakinada et al. |
| 10,499,409 B2 | 12/2019 | Shattil |
| 10,506,456 B2 | 12/2019 | Lou et al. |
| 10,531,309 B1 | 1/2020 | Li et al. |
| 10,536,859 B2 | 1/2020 | Gunasekara et al. |
| 10,680,883 B2 | 6/2020 | Hall et al. |
| 10,805,562 B2 | 10/2020 | Nakamura et al. |
| 10,980,025 B2 | 4/2021 | Hmimy et al. |
| 11,026,205 B2 | 6/2021 | Hmimy et al. |
| 11,129,171 B2 | 9/2021 | Hmimy |
| 11,190,861 B2 | 11/2021 | Bali |
| 11,219,026 B2 | 1/2022 | Kakinada et al. |
| 11,317,296 B2 | 4/2022 | Vaidya et al. |
| 11,363,466 B2 | 6/2022 | Khalid et al. |
| 11,438,771 B2 | 9/2022 | Syed et al. |
| 11,457,485 B2 | 9/2022 | Khalid et al. |
| 2002/0126748 A1 | 9/2002 | Rafie et al. |
| 2004/0001021 A1 | 1/2004 | Choo et al. |
| 2004/0196834 A1 | 10/2004 | Ofek et al. |
| 2006/0188004 A1 | 8/2006 | Kizu et al. |
| 2007/0022459 A1 | 1/2007 | Gaebel et al. |
| 2007/0094691 A1 | 4/2007 | Gazdzinski |
| 2008/0097913 A1 | 4/2008 | Dicks et al. |
| 2008/0220786 A1 | 9/2008 | Beacham |
| 2008/0220788 A1 | 9/2008 | Stanwood et al. |
| 2008/0235746 A1 | 9/2008 | Peters et al. |
| 2009/0034443 A1 | 2/2009 | Walker et al. |
| 2009/0129273 A1 | 5/2009 | Zou |
| 2009/0253438 A1 | 10/2009 | Chater-Lea et al. |
| 2010/0094956 A1 | 4/2010 | Zuckerman et al. |
| 2010/0128608 A1 | 5/2010 | Zou et al. |
| 2010/0234042 A1 | 9/2010 | Chan et al. |
| 2011/0014924 A1 | 1/2011 | Hwang et al. |
| 2011/0292970 A1 | 12/2011 | Lansford et al. |
| 2013/0122903 A1 | 5/2013 | Farnsworth et al. |
| 2013/0281092 A1 | 10/2013 | Gassend |
| 2013/0288675 A1 | 10/2013 | Gassend |
| 2013/0303145 A1 | 11/2013 | Harrang et al. |
| 2013/0315124 A1 | 11/2013 | Rapaport et al. |
| 2013/0336175 A1 | 12/2013 | Um et al. |
| 2014/0106672 A1 | 4/2014 | Jeon et al. |
| 2014/0194068 A1 | 7/2014 | Coppage et al. |
| 2014/0241187 A1 | 8/2014 | Barkay et al. |
| 2014/0269526 A1 | 9/2014 | Mitola, III |
| 2014/0308986 A1 | 10/2014 | Yang et al. |
| 2015/0055623 A1 | 2/2015 | Li et al. |
| 2015/0071239 A1 | 3/2015 | Zhang et al. |
| 2015/0208262 A1 | 7/2015 | Siomina |
| 2015/0280847 A1 | 10/2015 | Somasundaram et al. |
| 2015/0304856 A1 | 10/2015 | Garcia et al. |
| 2015/0334664 A1 | 11/2015 | Sawai et al. |
| 2015/0341753 A1 | 11/2015 | Chen et al. |
| 2016/0007147 A1 | 1/2016 | Zhang et al. |
| 2016/0073259 A1 | 3/2016 | Lee et al. |
| 2016/0127185 A1 | 5/2016 | McAllister |
| 2016/0128001 A1 | 5/2016 | Tsuda |
| 2016/0165066 A1 | 6/2016 | Yang et al. |
| 2016/0182134 A1 | 6/2016 | Kol et al. |
| 2016/0212031 A1 | 7/2016 | Jain et al. |
| 2016/0234746 A1 | 8/2016 | Gopal et al. |
| 2016/0330743 A1 | 11/2016 | Das et al. |
| 2016/0381600 A1 | 12/2016 | Aksu |
| 2017/0026203 A1 | 1/2017 | Thomas et al. |
| 2017/0155703 A1 | 6/2017 | Hao et al. |
| 2017/0164326 A1 | 6/2017 | Worrall |
| 2017/0208540 A1 | 7/2017 | Egner et al. |
| 2017/0237767 A1 | 8/2017 | George et al. |
| 2017/0257750 A1 | 9/2017 | Gunasekara et al. |
| 2017/0272955 A1 | 9/2017 | Sadek et al. |
| 2017/0295497 A1 | 10/2017 | MacMullan et al. |
| 2017/0295578 A1 | 10/2017 | Khoshnevisan et al. |
| 2017/0303138 A1 | 10/2017 | Barmettler et al. |
| 2017/0311290 A1 | 10/2017 | Adjakple et al. |
| 2017/0318472 A1 | 11/2017 | Yu et al. |
| 2018/0007587 A1 | 1/2018 | Feldman et al. |
| 2018/0049036 A1 | 2/2018 | Sethi et al. |
| 2018/0063736 A1 | 3/2018 | Sadeghi et al. |
| 2018/0063758 A1 | 3/2018 | Velu |
| 2018/0115903 A1 | 4/2018 | Badic et al. |
| 2018/0124613 A1 | 5/2018 | Kang et al. |
| 2018/0132112 A1 | 5/2018 | Khoshnevisan et al. |
| 2018/0146058 A1 | 5/2018 | Somayazulu et al. |
| 2018/0146408 A1 | 5/2018 | Meylan et al. |
| 2018/0167948 A1 | 6/2018 | Egner et al. |
| 2018/0199214 A1 | 7/2018 | Shen |
| 2018/0234403 A1 | 8/2018 | Casella et al. |
| 2018/0235007 A1 | 8/2018 | Gou et al. |
| 2018/0242184 A1 | 8/2018 | Yerramalli et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0323938 A1 | 11/2018 | Takeda et al. |
| 2018/0352386 A1 | 12/2018 | Gunasekara et al. |
| 2019/0021012 A1 | 1/2019 | Beck et al. |
| 2019/0028182 A1 | 1/2019 | Smyth et al. |
| 2019/0037480 A1 | 1/2019 | Sun et al. |
| 2019/0044614 A1 | 2/2019 | Khoshnevisan et al. |
| 2019/0081690 A1 | 3/2019 | Mueck et al. |
| 2019/0082447 A1 | 3/2019 | Harsha et al. |
| 2019/0098510 A1 | 3/2019 | Guo et al. |
| 2019/0098632 A1 | 3/2019 | Martin et al. |
| 2019/0104551 A1 | 4/2019 | Deenoo et al. |
| 2019/0150182 A1 | 5/2019 | Koorapaty et al. |
| 2019/0182895 A1 | 6/2019 | Di Girolamo et al. |
| 2019/0222266 A1 | 7/2019 | Cui et al. |
| 2019/0230613 A1 | 7/2019 | Kim et al. |
| 2019/0239190 A1 | 8/2019 | Patel et al. |
| 2019/0289470 A1 | 9/2019 | Vaidya et al. |
| 2019/0296789 A1 | 9/2019 | Yu et al. |

(56) References Cited

U.S. PATENT DOCUMENTS

| | | |
|---|---|---|
| 2019/0319814 A1 | 10/2019 | Das |
| 2019/0319858 A1 | 10/2019 | Das et al. |
| 2019/0320250 A1 | 10/2019 | Hoole et al. |
| 2019/0320322 A1 | 10/2019 | Jayawardene et al. |
| 2019/0320490 A1 | 10/2019 | Liu et al. |
| 2019/0320494 A1 | 10/2019 | Jayawardene et al. |
| 2019/0349848 A1 | 11/2019 | Bali |
| 2019/0364565 A1 | 11/2019 | Hmimy et al. |
| 2019/0373615 A1 | 12/2019 | Cimpu et al. |
| 2019/0393926 A1 | 12/2019 | Kakinada et al. |
| 2019/0394790 A1 | 12/2019 | Damnjanovic et al. |
| 2020/0021689 A1 | 1/2020 | Sultana et al. |
| 2020/0025629 A1 | 1/2020 | Zinger et al. |
| 2020/0053545 A1 | 2/2020 | Wong et al. |
| 2020/0059795 A1 | 2/2020 | Kakinada et al. |
| 2020/0083892 A1 | 3/2020 | Kundu et al. |
| 2020/0084759 A1 | 3/2020 | Liu et al. |
| 2020/0146058 A1 | 5/2020 | Xu et al. |
| 2020/0187150 A1 | 6/2020 | Eisner |
| 2020/0221392 A1 | 7/2020 | Xue et al. |
| 2020/0228993 A1 | 7/2020 | Gunasekara |
| 2020/0252933 A1 | 8/2020 | Hmimy et al. |
| 2020/0275457 A1 | 8/2020 | Hmimy |
| 2020/0344515 A1 | 10/2020 | Wong et al. |
| 2021/0026711 A1 | 1/2021 | Ovadia et al. |
| 2021/0037444 A1 | 2/2021 | Harel |
| 2021/0051653 A1 | 2/2021 | Park et al. |
| 2021/0076424 A1 | 3/2021 | Mukherjee et al. |
| 2021/0105633 A1 | 4/2021 | Vaidya et al. |
| 2021/0120315 A1 | 4/2021 | Makinen et al. |
| 2021/0126662 A1 | 4/2021 | Solichien |
| 2021/0127423 A1 | 4/2021 | Park et al. |
| 2021/0136838 A1 | 5/2021 | Khalid et al. |
| 2021/0204322 A1 | 7/2021 | Lou et al. |
| 2021/0219143 A1 | 7/2021 | Khalid et al. |
| 2021/0219303 A1 | 7/2021 | Khalid et al. |
| 2021/0235495 A1 | 7/2021 | Xu et al. |
| 2021/0258868 A1 | 8/2021 | Wong et al. |
| 2021/0266914 A1 | 8/2021 | Yoo et al. |
| 2021/0274506 A1 | 9/2021 | Raghavan et al. |
| 2021/0297979 A1 | 9/2021 | Hmimy et al. |
| 2021/0376905 A1 | 12/2021 | Zhou et al. |
| 2022/0007200 A1 | 1/2022 | Sevindik et al. |
| 2022/0007374 A1 | 1/2022 | Sevindik et al. |
| 2022/0167176 A1 | 5/2022 | Khalid |
| 2022/0183093 A1 | 6/2022 | Sevindik et al. |
| 2022/0191675 A1 | 6/2022 | Mukherjee |

FOREIGN PATENT DOCUMENTS

| | | |
|---|---|---|
| EP | 3741168 A1 | 11/2020 |
| GB | 2585394 A | 1/2021 |
| JP | 2021510973 A | 4/2021 |
| KR | 20140070528 A | 6/2014 |
| WO | WO-2013020599 A1 | 2/2013 |
| WO | WO-2017130494 A1 | 8/2017 |
| WO | WO-2017186294 A1 | 11/2017 |
| WO | WO-2019140461 A1 | 7/2019 |
| WO | WO-2019226838 A1 | 11/2019 |
| WO | WO-2020160403 A1 | 8/2020 |
| WO | WO-2021050957 A1 | 3/2021 |
| WO | WO-2021067810 A1 | 4/2021 |
| WO | WO-2021086986 A1 | 5/2021 |

OTHER PUBLICATIONS

"Internet Protocol, DARPA Internet Program, Protocol Specification", IETF RCF 791, Sep. 1981, 50 pages.

Palola M., et al., "Field Trial of the 3.5 GHz Citizens Broadband Radio ServiceGoverned by a Spectrum Access System (SAS)," IEEE International Symposium on Dynamic Spectrum Access Networks, 2017, 9 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

Souryal, Michael R., et al., "Effect of Federal Incumbent Activity on CBRS Commercial Service", International Symposium on Dynamic Spectrum Access Networks (DySPAN), IEEE 2019, 5 pages.

Kulacz, Lukasz, et al., "Coordinated Spectrum Allocation and Co-existence Management in CBRS-SAS Wireless Networks." IEEE Access 07, pp. 139294-139316. (Year: 2019).

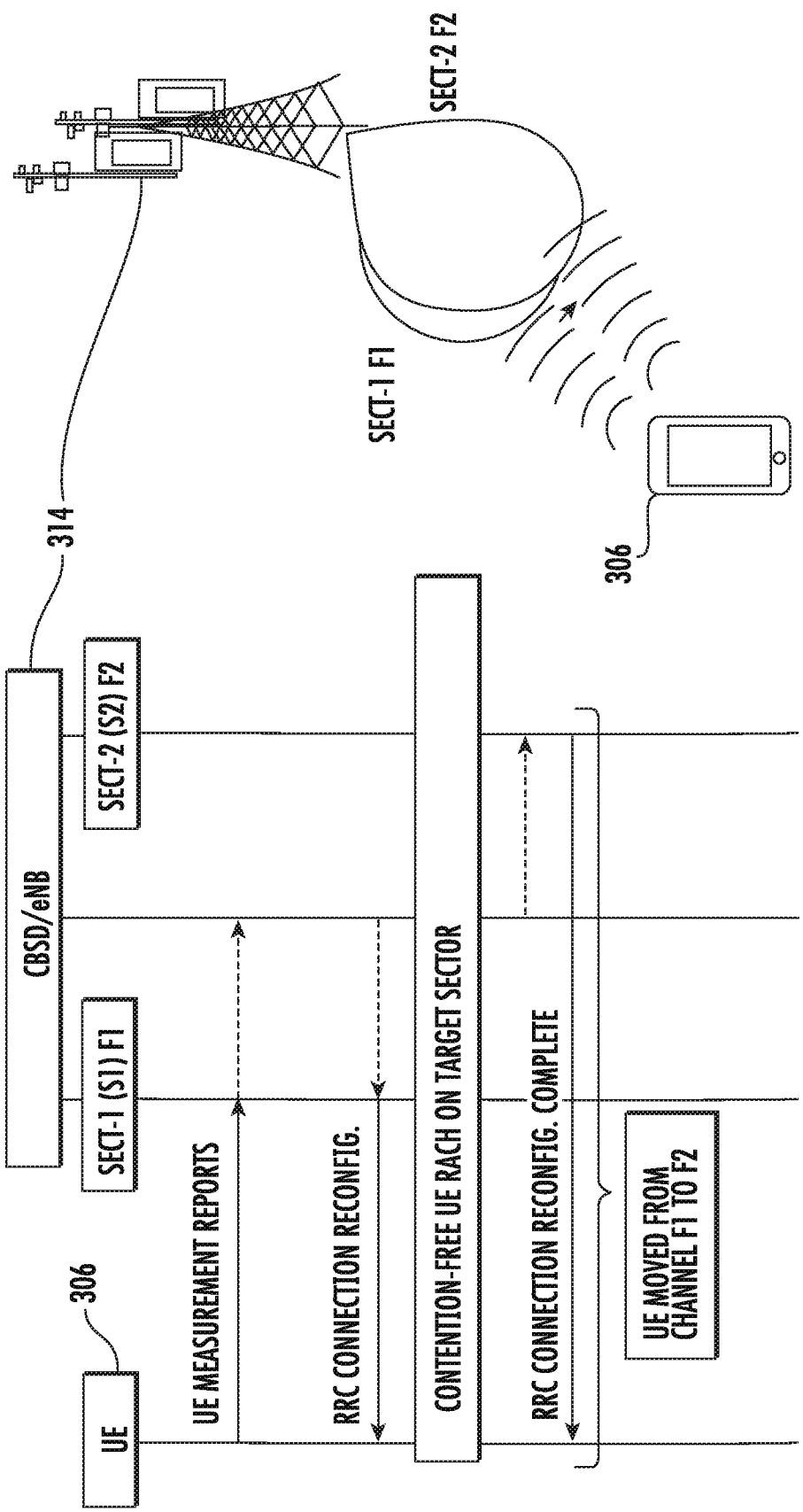

METHODS AND APPARATUS FOR INTRA-CELL AND INTER-FREQUENCY MOBILITY OPTIMIZATION AND MITIGATION OF SESSION DISRUPTION IN A QUASI-LICENSED WIRELESS SYSTEM

PRIORITY AND RELATED APPLICATIONS

This application is a continuation of and claims priority to and U.S. patent application Ser. No. 15/986,614 of the same title filed May 22, 2018, and issuing as U.S. Pat. No. 11,432,284 on Aug. 30, 2022, which is incorporated herein by reference in its entirety.

Additionally, this application is related to co-owned and co-pending U.S. patent application Ser. No. 15/902,833 filed Feb. 22, 2018 and entitled "METHODS AND APPARATUS FOR ALLOCATION AND RECONCILIATION OF QUASI-LICENSED WIRELESS SPECTRUM ACROSS MULTIPLE ENTITIES," which claims priority to U.S. Provisional Patent Application Ser. No. 62/617,549 filed Jan. 15, 2018 of the same title, as well as U.S. patent application Ser. No. 15/677,940 filed Aug. 15, 2017 and entitled "METHODS AND APPARATUS FOR DYNAMIC CONTROL AND UTILIZATION OF QUASI-LICENSED WIRELESS SPECTRUM", as well as Ser. No. 15/785,283 filed Oct. 16, 2017 and entitled "METHODS AND APPARATUS FOR COORDINATED UTILIZATION OF QUASI-LICENSED WIRELESS SPECTRUM," and Ser. No. 15/814,133 filed Nov. 15, 2017 and entitled "METHODS AND APPARATUS FOR UTILIZATION OF QUASI-LICENSED WIRELESS SPECTRUM FOR IOT (INTERNET-OF-THINGS) SERVICES," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically controlling and optimizing utilization of quasi-licensed radio frequency spectrum, such as for example those providing connectivity via Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the U.S., uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |

TABLE 2-continued

| Frequency range | Type | Center frequency | Availability | Licensed users |
|---|---|---|---|---|
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna<6m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of Session Continuity and Frequency Management—

Extant CBRS architectures, while promising from the standpoint of reduced contention for spectrum, currently lack mechanisms for maintaining service session continuity under various scenarios such as frequency change. In particular, when a given SAS instructs a CBSD to change frequency or reconfigure the serving channel (e.g., from 20 MHz to 10 MHz or 5 MHz), the system has to release all active users, obtain the new RF channel, and offer services on the new channel. Active users accordingly lose extant sessions, and hence are required to reconnect.

Session continuity can be of critical importance to those utilizing CBRS spectrum and services, especially for commercial purposes. Voice calls (e.g., VoIP or VoLTE) are particularly susceptible to "dropped" sessions, since call flow effectively terminates and then must be re-established; an obvious disability and unacceptable operating condition. User perceptions of reduced availability and discontinuous (interrupted) data service can negatively impact continued use and profitability of the service by any given service provider, especially where other competing services offered, by other providers and which do not suffer from similar disabilities are available. This vulnerability is particularly acute if the service provider does not have any licensed spectrum available to it (e.g., for cellular data services such as LTE/LTE-A), and hence must rely solely on the CBRS spectrum for wireless services in certain use cases or areas. Stated differently, since service providers such as cable or terrestrial MSOs have little or no licensed spectrum available to them, the ability of their users and subscribers to routinely and robustly utilize unlicensed spectrum such as CBRS GAA becomes that much more critical, especially within the context of roaming users or subscribers (e.g., MSO subscribers which roam from their normal service location, and hence must access communication modalities other than those normally accessible to them on their served premises, such as DOCSIS cable modems, Wi-Fi APs, etc.).

SUMMARY

The present disclosure addresses the foregoing needs by providing, inter alia, methods and apparatus for providing wireless spectrum allocation/re-allocation while maintaining session continuity.

In one aspect, a method for providing wireless spectrum reassignment is disclosed. In one embodiment, the wireless spectrum being allocated comprises CBRS-band spectrum with the GAA portion, and the method includes communicating data between at least one SAS entity and a CBSD to both (i) cause revocation of an existing channel, and (ii) instantiation of a new channel while the existing channel is still active so as to permit one or more UE being served by the existing channel to seamlessly migrate to a new target channel.

In one variant, the new channel is the new target channel. In another variant, the new channel comprises a temporary or ephemeral channel that is used as a "bridge" channel to the final new target channel.

In another aspect, a method for reassigning at least a portion of available wireless spectrum for a wireless access point is disclosed. In one embodiment, the method includes: determining that at least one RF (radio frequency) carrier requires reassignment; selecting, from a pool of available RF carriers, an RF carrier to act as a substitute RF carrier for the wireless access point; transmitting a first information element (IE) to the wireless access point specifying (i) the selected substitute RF carrier and (ii) a timer value; receiving confirmation that the wireless access point has activated the selected substitute RF carrier; and reclaiming the at least one RF carrier at or before the timer value expires.

In one variant, the method further includes: selecting a final RF carrier to which the wireless access point will be reassigned; and transmitting a second IE to the wireless access point specifying at least the selected final RF carrier.

The second IE enables the wireless access point to activate the selected final RF carrier and subsequently operate thereon prior to deactivation of the selected substitute RF carrier.

In one implementation, the method is further configured to maintain data session continuity, and further includes: causing the wireless access point to de-activate the at least one RF carrier requiring reassignment after the activation of the selected substitute RF carrier so as to maintain continuity of at least one extant data session being carried over the at least one RF carrier requiring reassignment; and causing the wireless access point to de-activate the selected substitute RF carrier after the activation of the selected final RF carrier so as to maintain continuity of the at least one extant data session being carried over the selected substitute RF carrier.

In a further implementation, the wireless access point comprises a CBRS (Citizens Broadband Radio Service)-compliant access point, and at least the acts of determining that at least one RF (radio frequency) carrier requires reassignment, selecting an RF carrier to act as a substitute RF carrier for the wireless access point, and selecting a final RF carrier to which the wireless access point will be reassigned, are performed by a computerized SAS (Spectrum Access System) or a domain proxy (DP) associated therewith.

In yet a further implementation, the CBRS-compliant access point further comprises an eNodeB (EUTRAN evolved Node B), and the method further comprises using 3GPP-compliant signaling to at least one user equipment (UE) in radio frequency communication with the eNodeB to (i) transfer to the selected substitute RF carrier, and (ii) thereafter transfer to the selected final RF carrier.

In another variant, the method further includes receiving data indicating that the wireless access point completed transition to the selected final RF carrier before exceeding the timer value.

In a further variant, the method includes causing withdraw or reallocation of the at least one RF (radio frequency) carrier requiring reassignment based at least on said receiving confirmation that the wireless access point has activated the selected substitute RF carrier. The withdraw or reallocation of the at least one RF (radio frequency) carrier requiring reassignment based at least on said receiving confirmation that the wireless access point has activated the selected temporary RF carrier occurs prior to the transmitting the second IE.

In another variant, the method includes establishing the pool of available RF carriers, a size of the pool of available RF carriers being based at least in part on data for a geographic region within which the wireless access point operates, the data indicating then-currently unused RF carriers.

In yet a further variant, the determining that at least one RF carrier requires reassignment is performed by a CBRS SAS (spectrum access system) entity, and the selecting, from a pool of available RF carriers, an RF carrier to act as a substitute RF carrier for the wireless access point is performed by a computerized process of a managed data network in data communication with the CBRS SAS, the selecting comprising an algorithmic analysis of at least: (i) a plurality of RF carriers currently in use by one or more other wireless access points within the managed data network, and (ii) the pool of available RF carriers.

In another aspect of the disclosure, a computerized wireless access node apparatus configured for providing wireless access to a plurality of computerized wireless-enabled mobile devices via a quasi-licensed portion of a radio frequency (RF) spectrum is disclosed. In one embodiment, the computerized wireless access node includes: a wireless interface configured to transmit and receive RF waveforms in the quasi-licensed portion; digital processor apparatus in data communication with the wireless interface; and a storage device in data communication with the digital processor apparatus and comprising at least one computer program.

In one variant, the at least one computer program is configured to, when executed by the digital processor apparatus: receive a first protocol message from a computerized network management entity, the first protocol message configured to cause the computerized wireless access node to determine an operational status of one or more RF carriers, the operational status relating to an existing data session on the one or more RF carriers; generate a response to the first protocol message, the response based at least on the determined operational status; receive a second protocol message from the computerized network management entity, the second protocol message configured to cause the computerized wireless access node to (i) activate a temporary RF carrier, and (ii) maintain the existing data session on at least the activated temporary carrier; deactivate the one or more RF carriers; receive a third protocol message from the computerized network management entity, the third protocol message configured to cause the computerized wireless access node to (i) activate a final RF carrier, and (ii) maintain the existing data session on at least the activated final carrier; and deactivate the temporary RF carrier.

In one implementation, the at least one computer program is further configured to, when executed, generate and transmit a protocol message to the computerized network management entity indicating that the one or more RF carriers have been deactivated.

In another implementation, the wireless interface configured to transmit and receive RF waveforms in the quasi-licensed portion comprises a CBSD (Citizens Broadband Radio Service Device) that is configured to utilize a CBRS-compliant spectrum; and the computerized wireless access node apparatus further comprises an eNodeB (EUTRAN evolved Node B), and the maintenance of the existing data session on at least the activated temporary carrier comprises use of 3GPP-compliant signaling to at least one of the plurality of computerized wireless-enabled mobile devices, the at least one wireless-enabled mobile device comprising a 3GPP-compliant user equipment (UE) in radio frequency communication with the eNodeB, the 3GPP-compliant signaling to cause the UE to transfer to the selected temporary RF carrier.

In another embodiment, the at least one computer program is configured to, when executed by the digital processor apparatus: receive a first protocol message from a first of the plurality of computerized wireless-enabled mobile devices via a first wireless sector of the wireless interface, the first protocol message configured to report data relating to the one or more RF carriers; receive a second protocol message from a computerized network management entity, the second protocol message configured to cause the computerized wireless access node to invoke a handover procedure; based at least on the second protocol message, signal a second wireless sector of the wireless interface regarding a new RF carrier to be utilized by the first computerized wireless-enabled mobile device; transmit a third protocol message to the first computerized wireless-enabled mobile device using the one or more RF carriers, the third protocol message configured to cause the first wireless-enabled mobile device to communicate with a second wireless sector of the wireless interface to establish communication on the new RF carrier; and send a fourth protocol message to the first computerized wireless-enabled mobile device via the new RF carrier confirming availability of the new RF carrier for use via the second wireless sector.

In one variant, the wireless interface configured to transmit and receive RF waveforms in the quasi-licensed portion comprises a CBSD (Citizens Broadband Radio Service Device) that is configured to utilize a CBRS-compliant spectrum; and the computerized wireless access node apparatus further comprises an eNodeB (EUTRAN evolved Node B), and the receipt of the first protocol message configured to report data relating to the one or more RF carriers comprises receipt of a 3GPP-compliant measurement report message from the at least one wireless-enabled mobile device, the at least one wireless-enabled mobile device comprising a 3GPP-compliant user equipment (UE) in radio frequency communication with the eNodeB.

In another variant, the wireless interface configured to transmit and receive RF waveforms in the quasi-licensed portion comprises a CBSD (Citizens Broadband Radio Service Device) that is configured to utilize a CBRS-compliant spectrum; the computerized wireless access node apparatus further comprises an eNodeB (EUTRAN evolved Node B); the third protocol message comprises a 3GPP-compliant RRC (Radio Resource Control) Connection Reconfiguration message; and the fourth protocol message comprises a 3GPP-compliant RRC Connection Reconfiguration Complete message.

In a further aspect of the disclosure, an improved SAS entity is disclosed. In one embodiment, the SAS is configured to dynamically adjust a pool of temporary or ephemeral RF carriers maintained for allocation to CBSDs during inter-frequency/sector, intra-cell handovers.

In another aspect of the disclosure, network apparatus for use within a first network is disclosed. In one embodiment, the network apparatus is configured to generate proposed RF carrier migration/reassignment plans, and includes: digital processor apparatus; network interface apparatus in data communication with the digital processor apparatus and configured to transact data with one or more computerized entities of the second network; and a storage apparatus in data communication with the digital processor apparatus and comprising at least one computer program.

In an additional aspect of the disclosure, computer readable apparatus is described. In one embodiment, the apparatus includes a storage medium configured to store one or more computer programs. In one embodiment, the apparatus includes a program memory or HDD or SDD on a computerized controller device, such as an MSO controller, DP, or SAS entity. In another embodiment, the apparatus includes a program memory, HDD or SSD on a computerized access node (e.g., CBSD).

In a further aspect, a system architecture for reassignment of unlicensed or quasi-licensed spectrum among a plurality of CBSDs is disclosed.

In still another aspect, an algorithmic engine is disclosed. In one embodiment, the engine comprises a plurality of computer-executable instructions which are configured to, when executed, (i) algorithmically evaluate available spectrum, and (ii) implement signaling to one or more affected CBSDs to select both temporary and target channels for use by the affected CBSD(s) so as to avoid session termination and frequency contention.

These and other aspects shall become apparent when considered in light of the disclosure provided herein.

BRIEF DESCRIPTION OF THE DRAWINGS

FIG. 6a-1 is a ladder diagram illustrating exemplary prior art CBRS protocol "heartbeat" messages and responses.

FIG. 7a is a ladder diagram illustrating an exemplary 3GPP-based implementation of the method of FIG. 7, wherein RRC Connection Reconfiguration messages are used to communicate with one or more UEs.

FIG. 7b is a graphical representation of the process of FIG. 7a.

Figure 1:
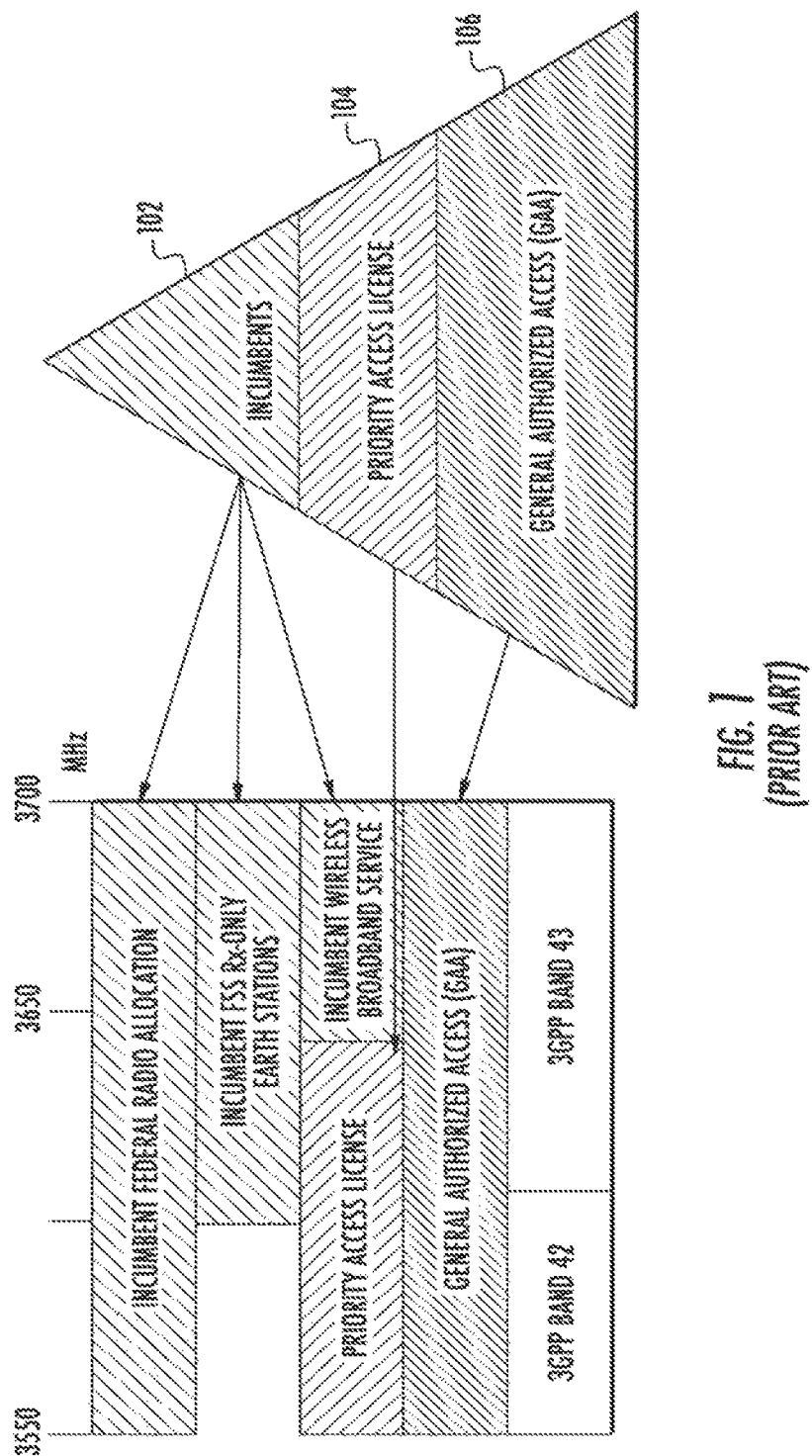
FIG. 1 is a graphical illustration of prior art CBRS (Citizens Broadband Radio Service) users and their relationship to allocated frequency spectrum in the 3.550 to 3.700 GHz band.
Figure 2:
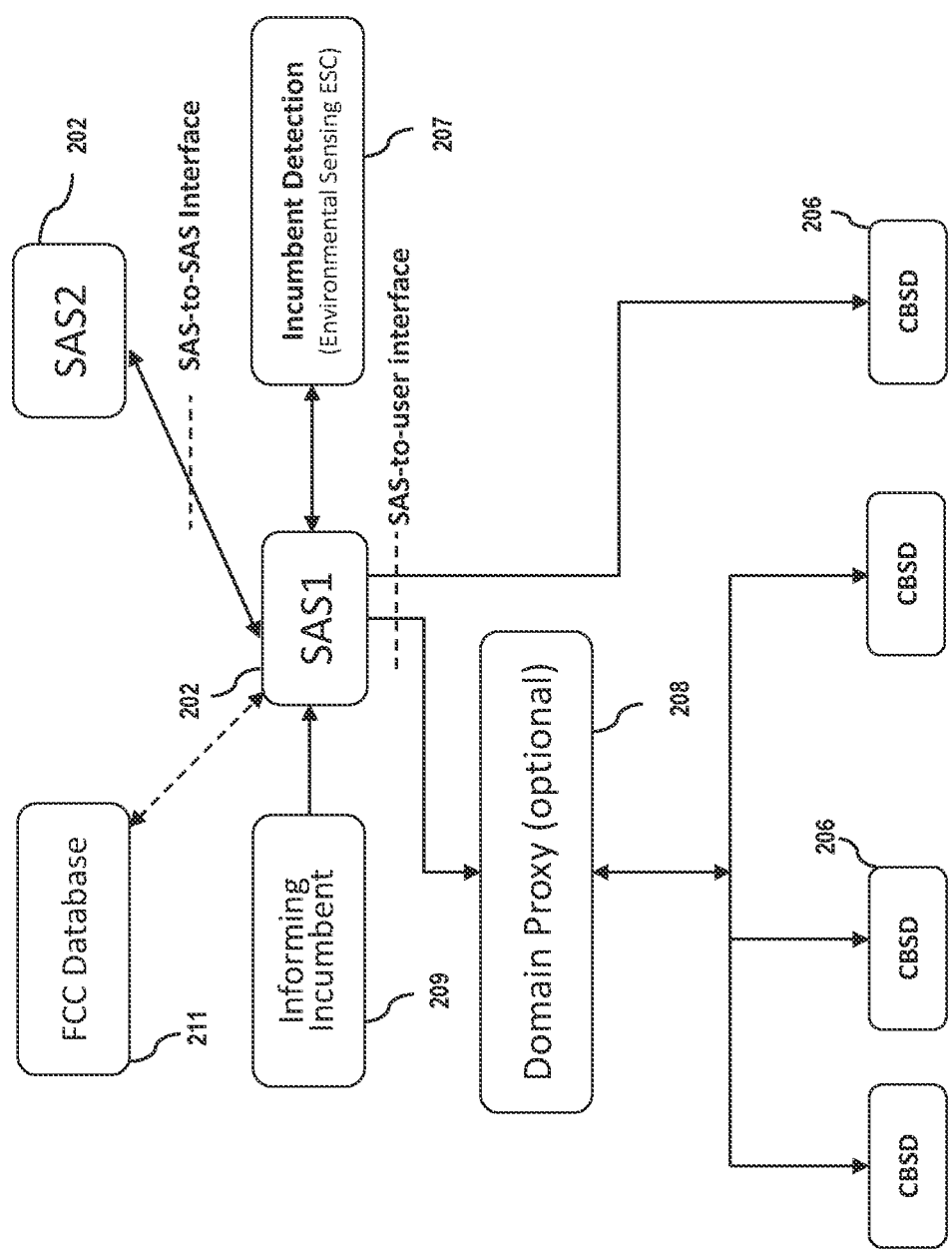
FIG. 2 is a block diagram illustrating a general architecture for the CBRS system of the prior art.
Figure 2A:
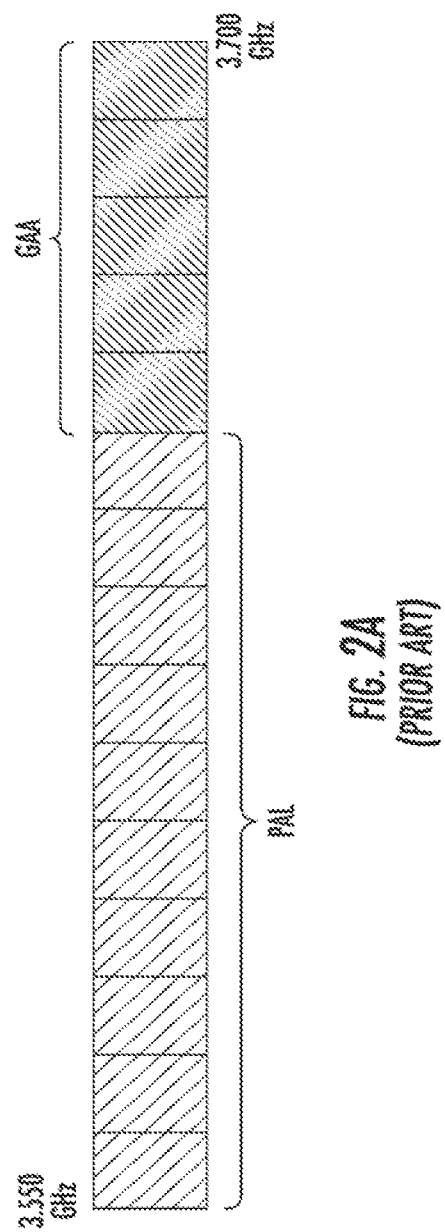
FIG. 2a is a graphical representation of allocations for PAL versus GAA users within the frequency band of FIG. 2.

All figures © Copyright 2017-2018 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards, including GSM, UMTS, CDMA2000, etc. (as applicable).

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/L IE-U/LTE-LAA, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

Overview

In one exemplary aspect, the present disclosure provides improved methods and apparatus for "seamless" reassignment or re-allocation of wireless spectrum, such as "quasi-licensed" spectrum such as that provided by the recent CBRS technology initiatives (e.g., GAA or General Authorized Access) spectrum as shown in FIG. 1 herein.

In an exemplary embodiment, a SAS and CBSD architecture is provided which allows, inter alia, intra-CBSD frequency reassignments (such as due to a SAS withdraw or grant revocation of a current allocated frequency band) without disruption or loss of continuity to existing data sessions of the CBSD and its constituent user devices, such as e.g., ongoing VoIP or VoLTE voice data sessions. The SAS (or a designated proxy agent) maintains a pool of temporary RF carriers to use as substitutes for the currently allocated (granted) carriers; the user devices are instructed by the relevant CBSD to migrate to a new "final" carrier via the substitutes, either directly or via one or more intermediary hops.

Advantageously, exemplary embodiments of the methods and apparatus described herein utilize existing 3GPP signaling mechanisms between, inter alia, the UE and CBSD (including EUTRAN eNodeB functionality), thereby obviating any changes to extant UEs in use. This is accomplished by maintaining two technology "stacks" in the CBSDs (i.e., a CBRS-compliant CBSD stack, and a 3GPP-compliant eNB or gNB stack for communication with 4G o 5G UEs respectively. CBRS-plane communications (e.g., between the CBSD and its parent or cognizant SAS/DP) include new information elements (IEs) or objects which, inter alia, direct the CBSD to implement the handover functionality within its served population of UEs using the CBSD's eNB/gNB stack.

In a further variant, inter-CBSD sector and frequency handovers are provided for using, inter alia, CBRS-plane and 3GPP signaling.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Moreover, while various aspects of the present disclosure are described in detail with respect to so-called "4G/4.5G" 3GPP Standards (aka LTE/LTE-A), such aspects—including allocation/use/withdrawal of CBRS spectrum—are generally access technology "agnostic" and hence may be used across different access technologies, including so-called 5G "New Radio" (3GPP Release 15 and TS 38.XXX Series Standards).

Other features and advantages of the present disclosure will immediately be recognized by persons of ordinary skill in the art with reference to the attached drawings and detailed description of exemplary embodiments as given below.

Service Provider Network—

Figure 3A:
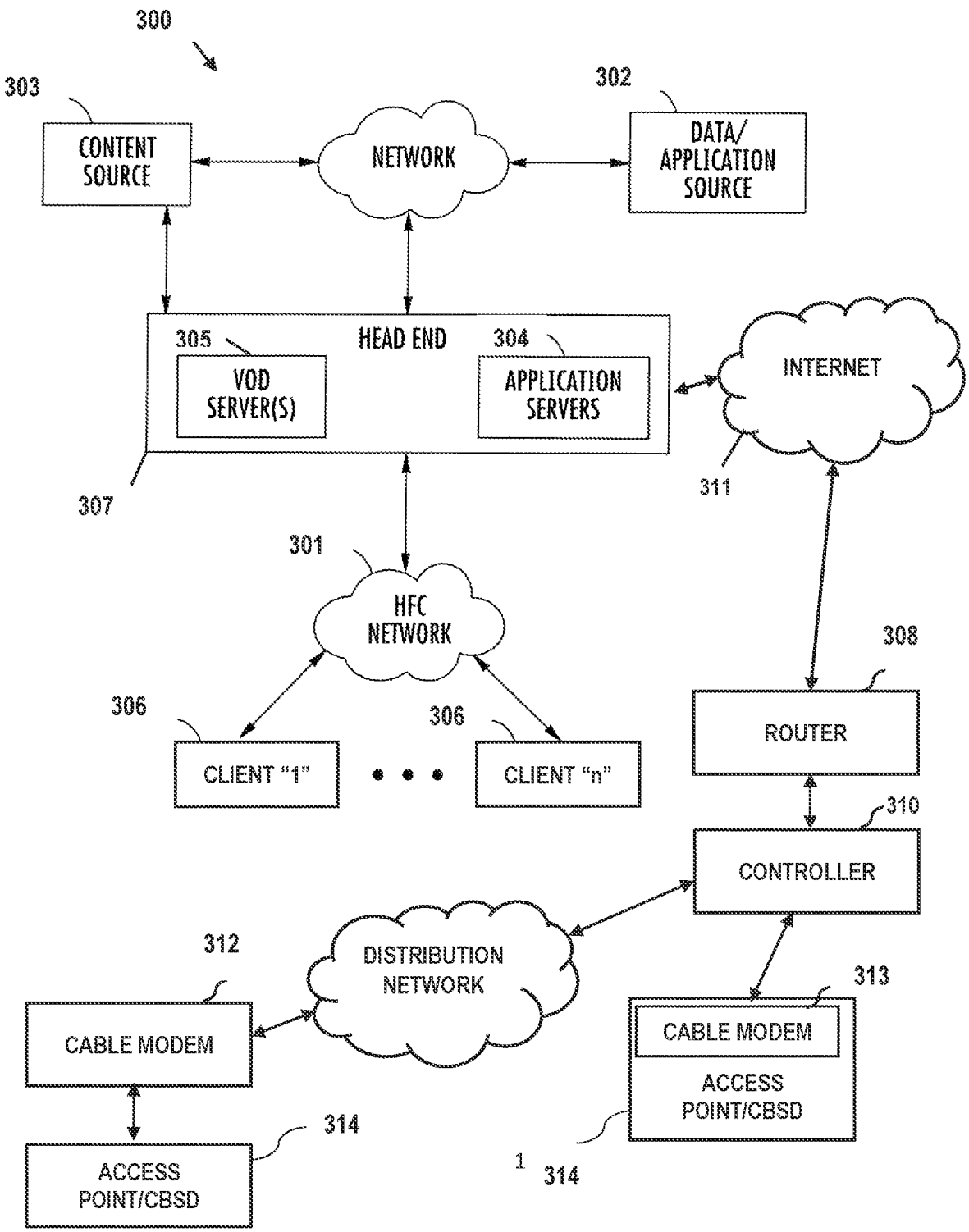
FIG. 3a is a functional block diagram illustrating an exemplary hybrid fiber network configuration useful with various aspects of the present disclosure.

FIG. 3a illustrates a typical service provider network configuration useful with the "seamless" spectrum re-assignment functionality and supporting CBRS-based wireless network(s) described herein. It will be appreciated that while described with respect to such network configuration, the spectrum reassignment methods and apparatus described herein may readily be used with other network types and topologies, whether wired or wireless, managed or unmanaged.

The exemplary service provider network 300 is used in one embodiment of the disclosure to provide backbone and Internet access from the service provider's wireless access nodes (e.g., CBSDs, Wi-Fi APs or base stations 314 operated or maintained by the service provider or its customers/subscribers), one or more stand-alone or embedded cable modems (CMs) 312, 313 in data communication therewith, or even third party access points accessible to the service provider via, e.g., an interposed network such as the Internet 311 (e.g., with appropriate permissions from the access node owner/operator/user).

As described in greater detail subsequently herein with respect to FIG. 4a, one or more controllers 310 are optionally utilized for, inter alia, control of the wireless network access nodes 314 at least partly by the MSO. As opposed to an unmanaged network, the managed service-provider network 300 of FIG. 3a advantageously allows, inter alia, control and management of a given user's access (such user which may be a network subscriber, or merely an incidental/opportunistic user of the service) via the wireless access node(s) 314, including imposition and/or reconfiguration of various access "rules" or other configurations applied to the wireless access nodes, as well as assisting in "seamless" handovers invoked by the cognizant SAS. For example, the service provider network 300 allows components at a venue of interest (e.g., CBSDs, Wi-Fi APs and any supporting infrastructure such as routers, switches, etc.) to be remotely reconfigured by the network MSO, based on e.g., prevailing operational conditions in the network, changes in user population and/or makeup of users at the venue, business models (e.g., to maximize profitability or provide other benefits such as enhanced user experience, as described infra), spectrum channel changes or withdrawals by the SAS (see FIG. 5), or even simply to enhance user experience using one RAT (e.g., CBRS) when another RAT (e.g., WLAN is sub-optimal for whatever reason). It also permits communication of data from the CBSDs backwards towards the controller, including configuration and demand data relating to the individual CBSDs for purposes of facilitating seamless handover.

In certain embodiments, the service provider network 300 also advantageously permits the aggregation and/or analysis of subscriber- or account-specific data (including inter alia, particular mobile devices associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 307 so as to permit or at least facilitate, among other things, (i) user authentication; (ii) correlation of aspects use cases or applications to particular subscriber demographics, such as for delivery of targeted advertising; and (iii) determination of subscription level, and hence subscriber privileges and access to content/features. Moreover, device profiles for particular user devices can be maintained by the MSO, such that the MSO (or its automated proxy processes) can model the user device for wireless capabilities.

The wireless access nodes 314 disposed at the service location(s) (e.g., areas or venue(s) of interest) can be coupled to the bearer managed network 300 (FIG. 3a) via, e.g., a cable modem termination system (CMTS) and associated local DOCSIS cable modem (CM) 312, 313, a wireless bearer medium (e.g., an 802.16 WiMAX or millimeter wave system—not shown), a fiber-based system such as FiOS or similar, a third-party medium which the managed network operator has access to (which may include any of the foregoing), or yet other means.

The various components of the exemplary embodiment of the network 300 generally include (i) one or more data and application origination sources 302; (ii) one or more content sources 303, (iii) one or more application distribution servers 304; (iv) one or more video-on-demand (VOD) servers 305, (v) client devices 306, (vi) one or more routers 308, (vii) one or more wireless access node controllers 310 (may be placed more locally as shown or in the headend or "core" portion of network), (viii) one or more cable modems 312, 313, and/or (ix) one or more access nodes 314 (which may also include 3GPP-compliant EUTRAN eNodeB functionality as described elsewhere herein). The application server(s) 304, VOD servers 305 and client device(s) 306 are connected via a bearer (e.g., HFC) network 301. A simple architecture comprising one of each of certain components 302, 303, 304, 305, 308, 310 is shown in FIG. 3a for simplicity, although it will be recognized that comparable architectures with multiple origination sources, distribution servers, VOD servers, controllers, and/or client devices (as well as different network topologies) may be utilized consistent with the present disclosure.

It is also noted that cable network architecture is typically a "tree-and-branch" structure, and hence multiple tiered access nodes 314 (and other components) may be linked to each other or cascaded via such structure.

Figure 3B:
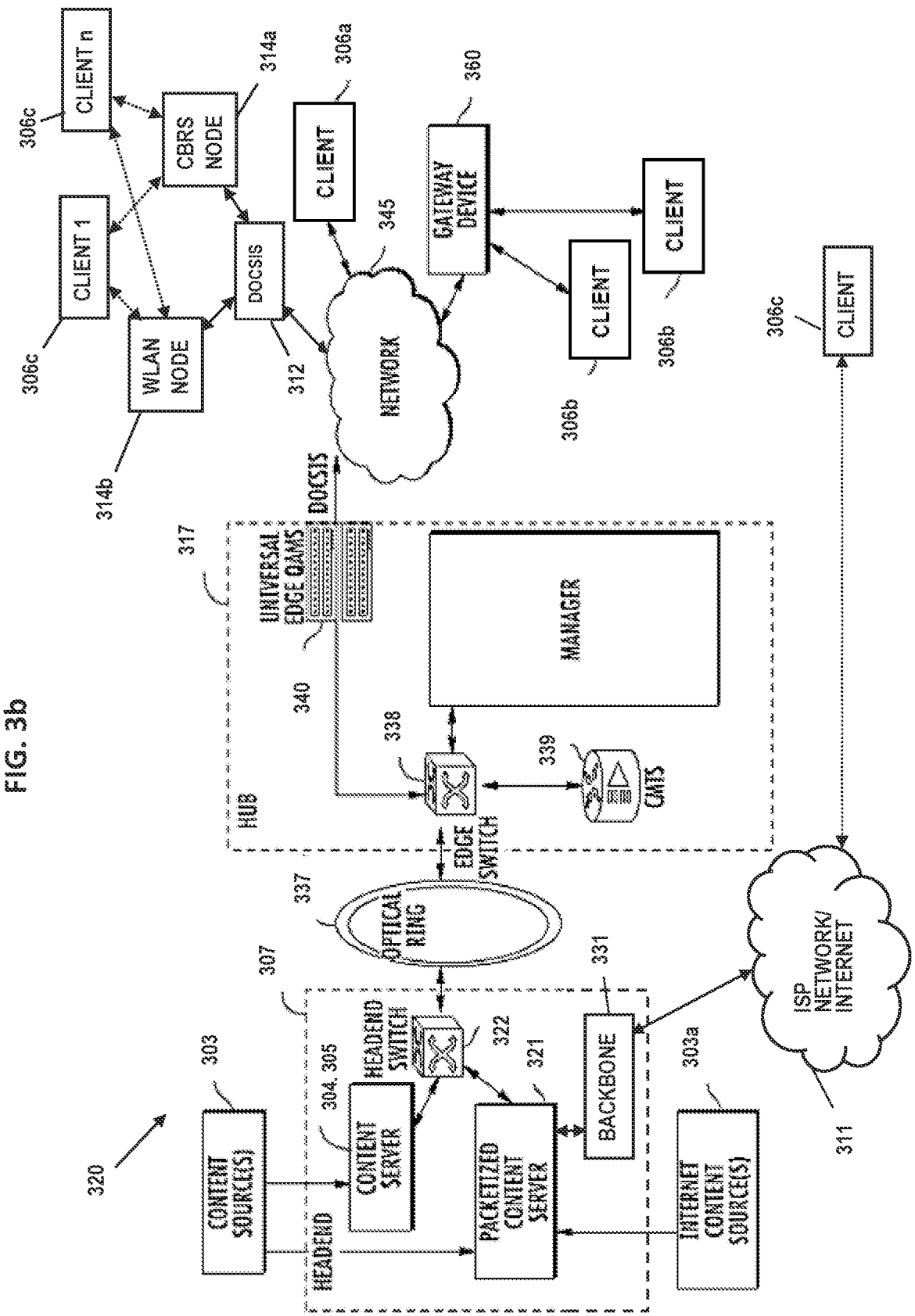
FIG. 3b is a functional block diagram of an exemplary packetized content network architecture useful in conjunction with various principles described herein.

FIG. 3b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3b may deliver Internet data and OTT (over-the-top) services to the end users (including those of the access nodes 314) via the Internet protocol (IP) and TCP, although other protocols and transport mechanisms of the type well known in the digital communication art may be substituted.

The network architecture 320 of FIG. 3b generally includes one or more headends 307 in communication with at least one hub 317 via an optical ring 337. The distribution hub 317 is able to provide content to various user/client devices 306, and gateway devices 360 as applicable, via an interposed network infrastructure 345.

Various content sources 303, 303a are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303a (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multi-purpose (e.g., where a given server is capable of servicing requests from different sources).

The network architecture 320 of FIG. 3b may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the access node 314). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 312 and associated end-user devices 306a, 306b of the implementation of FIG. 3b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway 360 or cable modem 312, and distributed to one or more respective client devices/UEs 306a, 306b, 306c in communication therewith.

In one implementation, the CM 312 shown in FIG. 3b services an area which may includes a venue, such as a conference center or hospitality structure (e.g., hotel), which includes a CBRS node 314a for CBRS-band (3.5 GHz) access, and a WLAN (e.g., Wi-Fi) node 314b for WLAN access (e.g., within 2.4 GHz ISM band). Notably, the client devices 306c communicating with the access nodes 314a, 314b, as described in greater detail subsequently herein, can utilize either RAT (CBRS/3GPP or WLAN) depending on, inter alia, directives received from the MSO controller 310 (FIG. 3a) via one access node 314 or the other, or even indigenous logic on the client device 306c enabling it to selectively access one RAT or the other. Feasibly, both RATs could operate in tandem, since they utilize different frequencies, modulation techniques, interference mitigation techniques, Tx power, etc.

In parallel with (or in place of) the foregoing delivery mechanisms, the MSO backbone 331 and other network components can be used to deliver packetized content to the user's mobile client device 306c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306c utilizing an Internet browser or MSO/third-party app to stream content according to an HTTP-based approach).

Wireless Services Architecture—

Figure 4A:
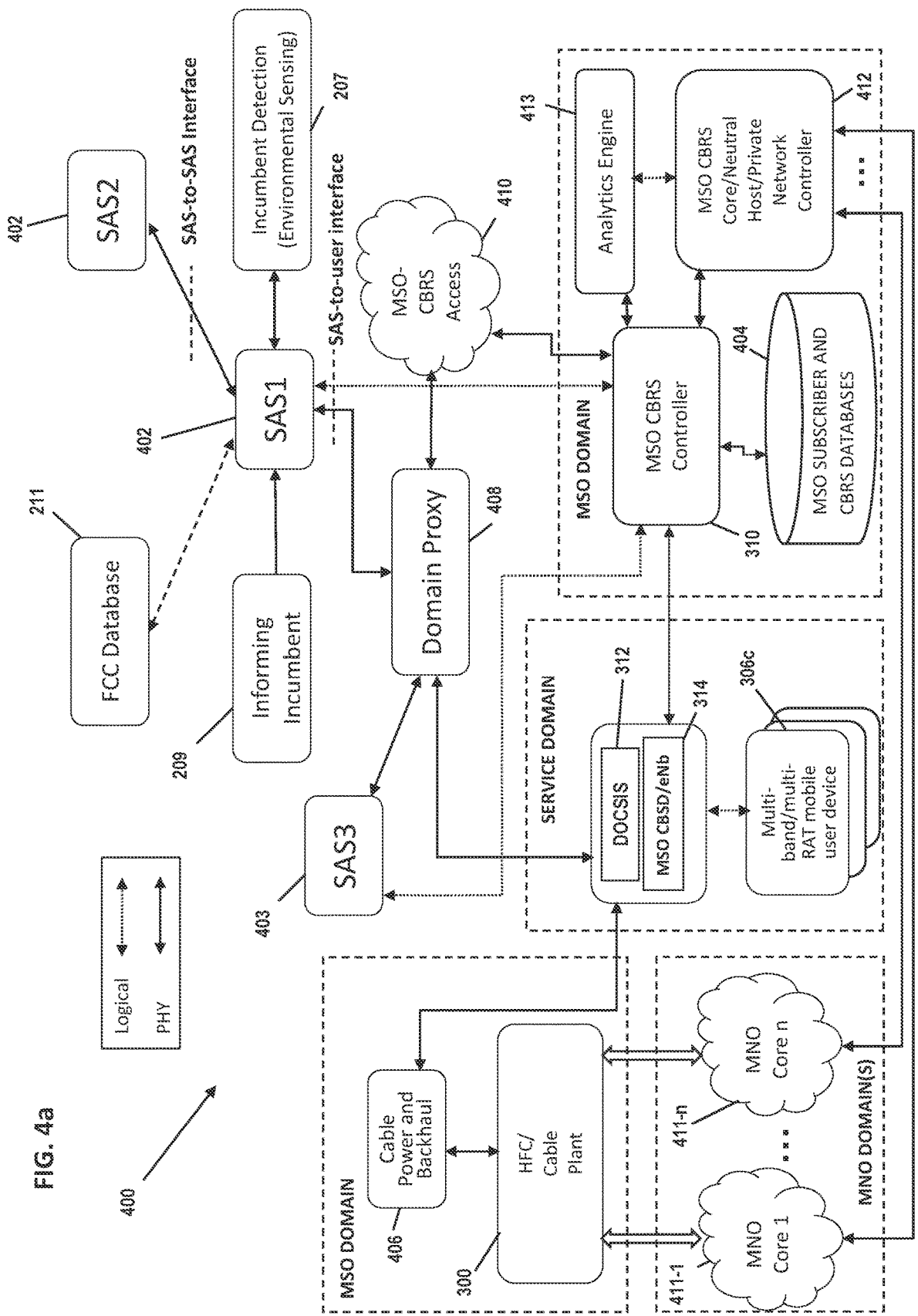
FIG. 4a is a functional block diagram of a first exemplary embodiment of a quasi-licensed wireless network infrastructure useful with various aspects of the present disclosure.

FIG. 4a illustrates an exemplary embodiment of a network architecture 400 useful in implementing the "seamless" reassignment of CBRS-based wireless RAT users according to the present disclosure. As used in the present context, the term "users" may include without limitation end users (e.g., individuals, whether subscribers of the MSO network, the MNO network, or other), venue operators, third party service providers, or even entities within the MSO itself (e.g., a particular department, system or processing entity).

It will be appreciated that while described primarily in terms of CBSDs 314 which also include EUTRAN (3GPP) compliant eNodeB functionality, the latter is by no means of requirement of practicing the broader features of the invention, and in fact non-3GPP signaling and protocols may be utilized to support the various functions described herein. Due to its current ubiquity (especially in mobile devices or UEs), however, the extant 3GPP protocols provide a convenient and effective platform which can be leveraged for CBRS-based operation.

As shown, the illustrated embodiment of the architecture generally includes an MSO-maintained CBRS controller 310 (which may be disposed remotely at the backend or headend of the system within the MSO domain as shown or at the served venue, or at an intermediary site), a CBRS Core/Neutral Host/Private Network Controller 413, an analytics engine 413 in data communication with the CBRS controller 310, an MSO-maintained subscriber and CBRS database 404, one or more CBSD/eNB access nodes 314 in data communication with the CBRS controller 310 (e.g., via existing network architectures including any wired or wireless connection), as well as any number of client devices 306c (smartphones, laptops, tablets, watches, vehicles, etc.). The CBSD/eNB 314 includes in the illustrated embodiment an embedded cable modem 312 used for communication with a corresponding CMTS 339 (FIG. 3b) within the MSO's (e.g., cable) plant 300 via cable power and backhaul infrastructure 406, including high-data bandwidth connections to the MSO's backbone 331, and electrical power for the CBSD. A MNO (mobile network operator) network 411 also may communicate with the MSO network via the backhaul 406, such as for inter-operator communications regarding common users/sub scribers.

As described subsequently herein, the presence of the MSO controller 310 and analytics engine 413 is optional for purposes of implementing the seamless intra-cell frequency/sector reassignment methodologies described herein; notably, certain embodiments utilize direct communication between the cognizant SAS (or DP) and the target CBSDs/eNBs, with no need for controller support. However, as discussed elsewhere herein, certain analytics and control functions may be performed by the MSO controller 310 and associated analytics engine in support of efficient and seamless handovers, depending on inter alia, the degree of integration between the cognizant SAS/DP and the MSO desired. For example, in one implementation, certain sets of rules or priorities may be implemented at the MSO level via logic on the controller 310 and analytics engine 413 which are not visible to the SAS (the SAS being largely agnostic to particulars of each MSO/MNO domain which it serves). As such, the SAS (or DP) may provide the MSO domain with higher-level instructions or directives on frequency/carrier use, reclamation, time periods, etc., and effectively let the MSO domain decide how to execute the process consistent with those instructions or directives. Likewise, the controller 310 and associated logic can act merely as a passive monitor of the transactions between the SAS/DP and relevant target CBSDs/eNBs, so as to maintain accurate accounting of user/frequency/CBSD mapping (i.e., which UE is using what frequencies via what CBSD/eNB at any given time), without actively participating in the handover process.

As shown in FIG. 4a, in operation, the Domain Proxy (DP) 408 is in logical communication with the CBSD/eNB disposed at the venue (either directly, as shown, or via MSO backend network infrastructure) and the MSO CBRS controller 310. The DP 408 provides, inter alia, SAS interface for the CBSD/eNB, including directive translation between CBSD/eNB 314 and SAS commands, bulk CBSD/eNB directive processing, and interference contribution reporting to the SAS (i.e., to help an SAS tune or update its predictive propagation models and detect realistic interference issues once CBSDs/eNBs are deployed, the CBSDs/eNBs can provide signal strength and interference level measurements).

The MSO controller 310 in the illustrated embodiment communicates with the DP 208 via an MSO CBRS access network 410, which may be a public internetwork (e.g., the Internet), private network, or other, depending on any security and reliability requirements mandated by the MSO and/or SAS.

As used herein, a CBRS "domain" is defined is any collection of CBSDs/eNBs 314 that are or need to be grouped for management, whether logically or by other scheme; e.g.: according to network operator (NO), according to a serving SAS vendor, and/or by physical disposition (e.g., within a large enterprise, venues, certain geographic area, etc.) In the embodiment of FIG. 4a, the DP 408 aggregate control information flows to the SAS1 402 and/or any participating other SAS (SAS2), which may be e.g., a Commercial SAS (CSAS)) 403, and generates performance reports, channel requests, heartbeats, and other types of data, including data necessary for operation of the spectrum allocation algorithms described in greater detail subsequently herein. In the illustrated embodiment, the DP 408 is operated by a third-party service provider, although it will be appreciated that the MSO may operate and maintain the DP 408, and or operate/maintain its own internal DP, such as for channel request processing, aggregation, reporting, and other of the above-listed functions for the MSO's internal CBRS domains, for interface with an external DP 408.

Figure 4B:
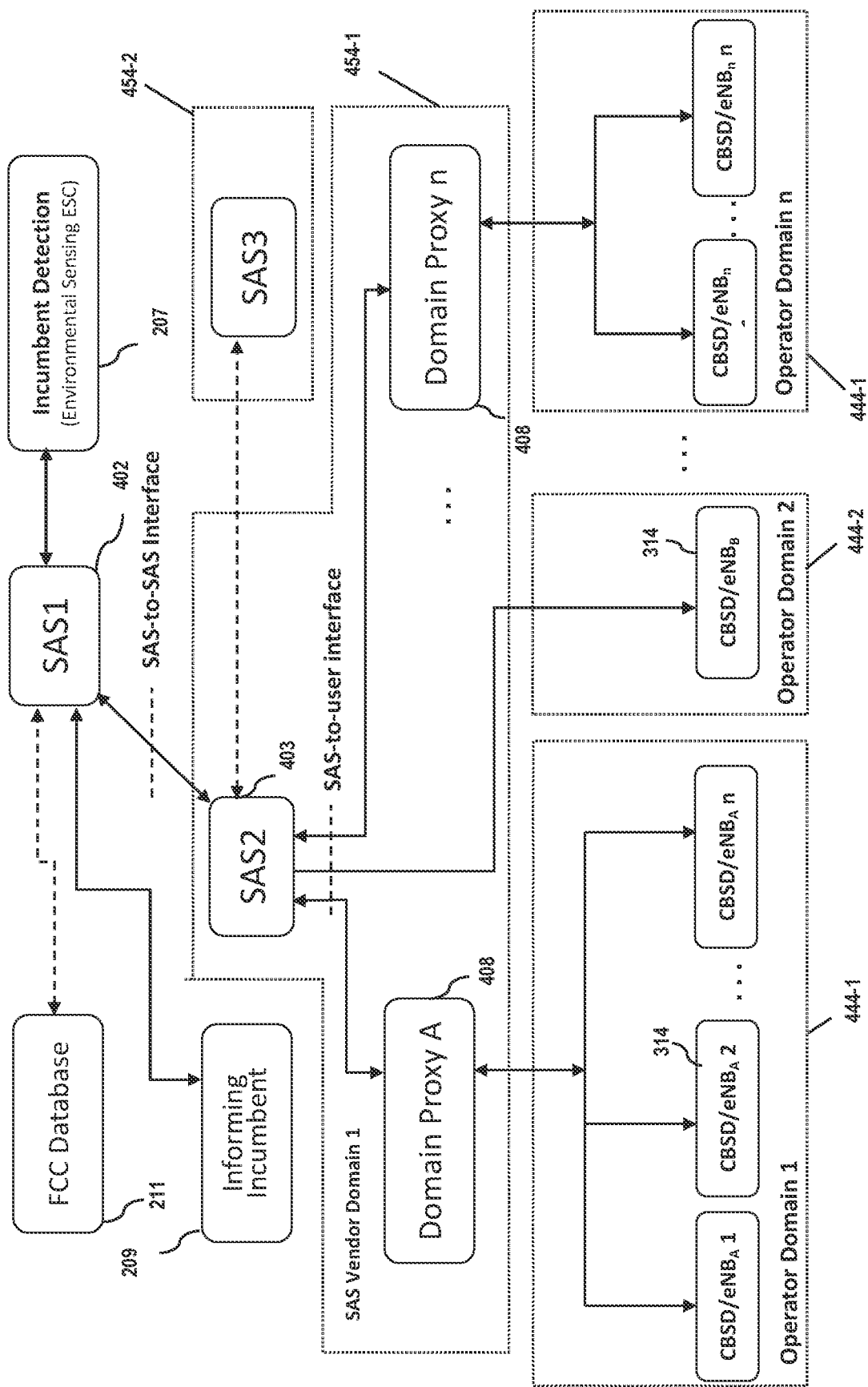
FIG. 4b is a functional block diagram of a first exemplary embodiment of a quasi-licensed wireless network architecture useful with various aspects of the present disclosure, including operator domains and SAS vendor domains.
Figure 4C:
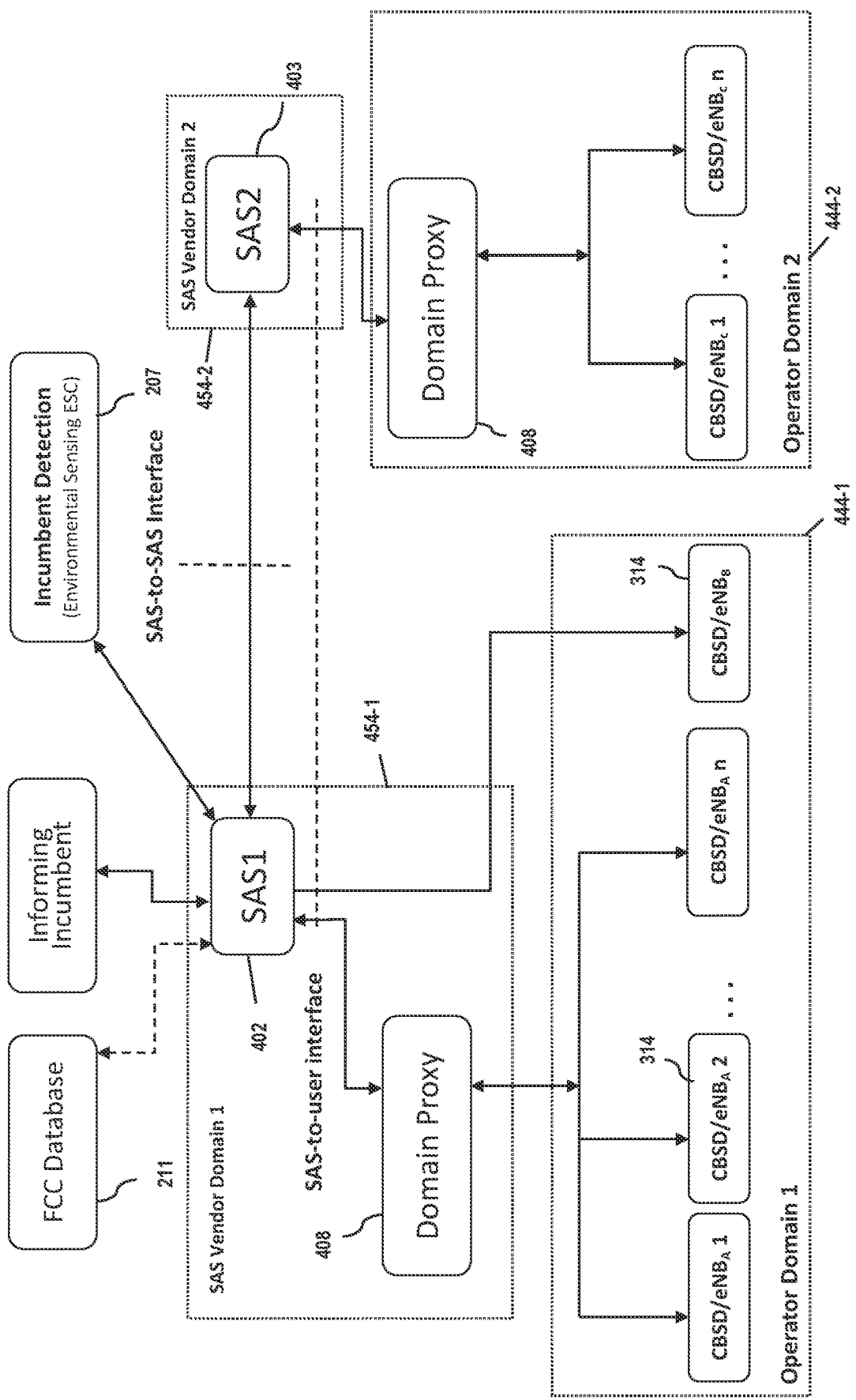
FIG. 4c is a functional block diagram of a second exemplary embodiment of a quasi-licensed wireless network architecture useful with various aspects of the present disclosure, including operator domains and SAS vendor domains.

FIGS. 4b and 4c illustrate exemplary alternate configurations of SAS1 402, SAS2 403, and DPs 408 useful with the various embodiments of the seamless handover methodologies and apparatus described herein. It will be appreciated that these configurations are intended merely to illustrate operation of the aforementioned allocation methods and apparatus of the present disclosure, and should in no way be considered limiting. Adaptation of the methods and apparatus described herein to yet other types of configurations can be accomplished by those of ordinary skill when provided the present disclosure.

As shown in FIG. 4b, multiple operator domains 444 are serviced by respective CBSDs/eNBs 314. Two domains 444-1 of the three operator domains are served by respective DPs 408 within a first SAS vendor domain 454-1. The two DPs 408 are served by a common SAS (SAS2 403), which interfaces with the SAS1 402 outside the domain 454-1 as illustrated. The third operator domain 444-2 is directly served by the SAS3 403, with no DP (e.g., this domain 444-2 may for example include its own internal DP, or has otherwise obviated the functions thereof).

Referring now to FIG. 4c, multiple operator domains 444 are again serviced by respective CBSDs/eNBs 314. One of the two operator domains 444-1 are served by respective DPs 408 within respective SAS vendor domains 454-1 and 454-2. The two DPs 408 are served by different SAS; e.g., SAS1 402 for the first domain 454-1, which interfaces with incumbent detection apparatus 207 and the FCC database 211 (as well as informing incumbents) as illustrated. The second operator domain 444-2 and its DP 408 are served by SAS2 403 within vendor domain 454-2.

Figure 4D:
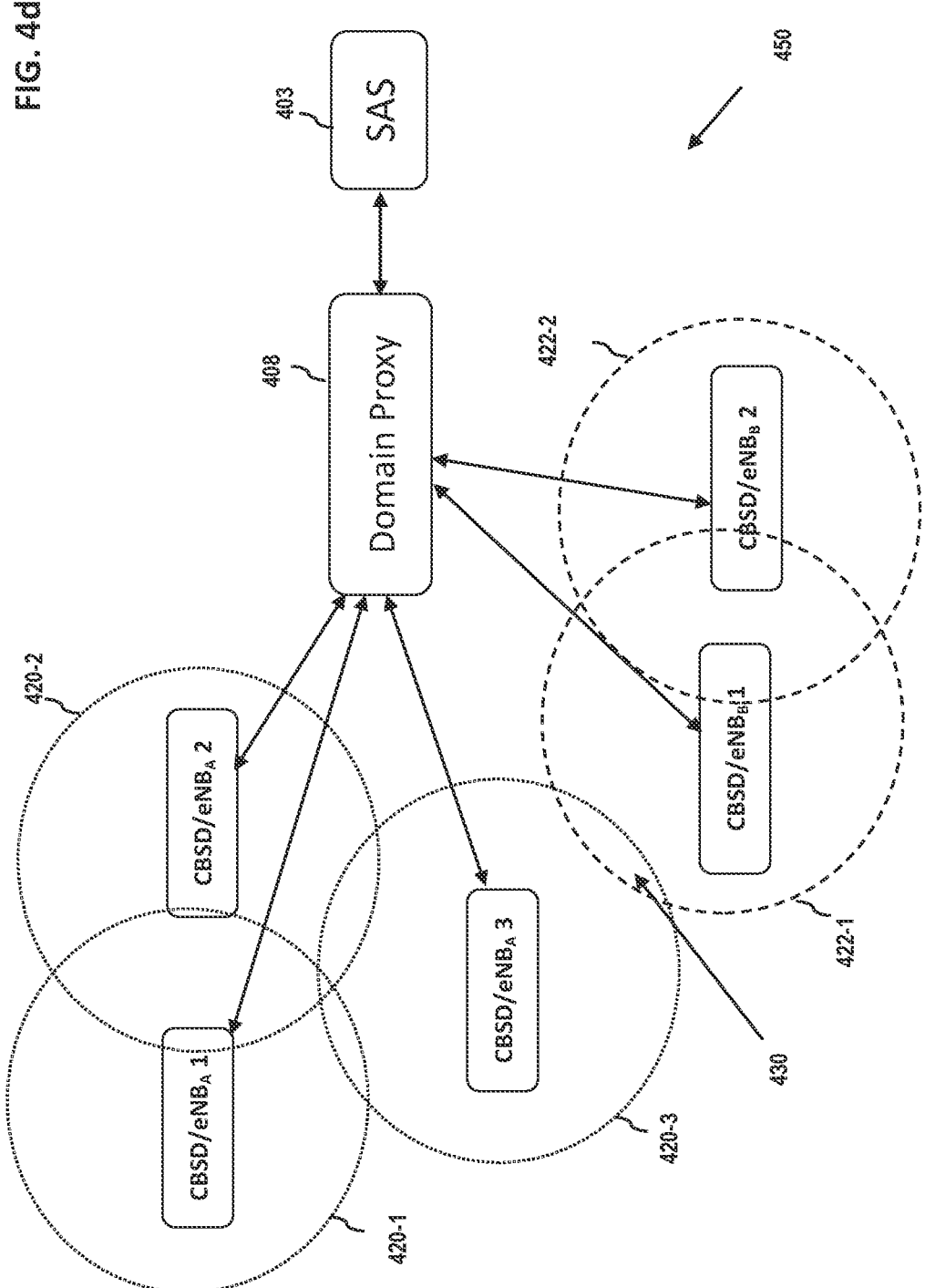
FIG. 4d is a graphical representation of an overlapping CBSD/eNB service coverage scenario wherein frequency re-use can be selectively applied.

It will be appreciated that various spectrum re-assignment methods and apparatus described herein may selectively make use of frequency/spectral re-use algorithms on an inter-cell basis to e.g., more densely pack users spatially into a given region of interest, and/or avoid "stranding" of spectrum which could otherwise be used productively. As one example of the foregoing, consider the arrangement 450 reflected in FIG. 4d. Here, two domains 420, 422 have area overlap 430 between the coverage areas 420-3, 422-1 of two respective CBSDs/eNBs 314 of the different domains (CBSD/eNB$_A$ 3 and CBSD/eNB$_B$ 1). Otherwise, the coverage area of the two domains do not overlap. Hence, for frequency re-use purposes, allocated GAA spectrum can be re-used within all other areas of the domains, since there is no chance of interference from common use of the same frequency band(s) based on geographic separation. This potential for re-use is significant, since an ostensible maximum allocation of 150 MHz for GAA users within a region (with minimum at 80 MHz) may cause significant constraints on servicing additional users within a region without such re-use.

Returning again to FIG. 4a, the MSO subscriber and CBRS database 404 includes several types of data useful in operation of the system 400. As part thereof, the MSO database 404 includes data relating to, among other things: (i) CBSD/eNB identification (e.g., MAC), (ii) CBSD/eNB location, (iii) association with parent or child nodes or networks (if any), and (iv) CBRS configuration and capabilities data. The CBRS database 404 may also include MSO-maintained data on spectrum usage and historical patterns, channel withdrawals, and other data which enable the MSO to proactively "plan" channel usage and re-assignment within the venue(s) of interest where the CBSD/eNB(s) 314 operate in certain embodiments herein.

In certain embodiments, each CBSD/eNB 314 is located within and/or services one or more areas within one or more venues (e.g., a building, room, or plaza for commercial, corporate, academic purposes, and/or any other space suitable for wireless access). Each CBSD/eNB 314 is configured to provide wireless network coverage within its coverage or connectivity range. For example, a venue may have a wireless modem installed within the entrance thereof for prospective customers to connect to, including those in the parking lot via inter alia, their LTE-enabled vehicles or personal devices of operators thereof. Notably, different classes of CBSD/eNB 314 may be utilized. For instance, Class A eNBs can transmit up 30 dbm (1 watt), while Class-B eNBs can transmit up to 50 dbm, so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc.

In the exemplary embodiment, one or more CBSDs/eNBs 314 may be indirectly controlled by the CBRS controller 310 (i.e., via infrastructure of the MSO network), or directly controlled by a local or "client" CBRS controller disposed at the venue (not shown). Various combinations of the foregoing direct and indirect control may be implemented within the architecture 400 of FIG. 4a as desired. The controller 310 is implemented in this instance as a substantially unified logical and physical apparatus maintained within the MSO domain, such as at an MSO headend or hubsite, and in communication with the MNO core 411 via the MSO core function 412. The controller 310 also optionally includes algorithms to optimize operation of the "local" CBRS network maintained by the MSO, such as within a target venue or area, when supporting operation of the SAS/DP inter-cell handover procedures (e.g., where the MSO controller is tasked with generating a migration plan, as described in greater detail below). These optimizations may include for example: (a) utilization of the environmental interference data to characterize the CBRS band(s) of the venue/area; (b) use the characterization of (a) to structure migration plans for frequency reassignment within the CBRS band(s) to the DP/SAS (e.g., which will mitigate interference or contention/collisions within the venue/are in those bands); (c) use the interference data and other relevant data (e.g., attendance, time, interference/signal as a function of CBSD/eNB location, etc.) to build historical profiles of spectrum use a function of various variables, including profiles particular to the venue/area itself, as described in co-pending U.S. patent application Ser. No. 15/612,630 filed Jun. 2, 2017 entitled "APPARATUS AND METHODS FOR PROVIDING WIRELESS SERVICE IN A VENUE," and issued as U.S. Pat. No. 10,645,547 on May 5, 2020, incorporated herein by reference in its entirety; (d) utilize data regarding spectrum availability withdrawals (e.g., where DoD assets require use of a previously allocated band) and other events to generate predictive or speculative models on CBRS band utilization as a function of time, including in support of migration plans.

Methods—

Various methods and embodiments thereof for providing quasi-licensed (e.g., CBRS GAA) spectrum and/or sector reassignment according to the present disclosure are now described with respect to FIGS. 5-7b.

Figure 5:
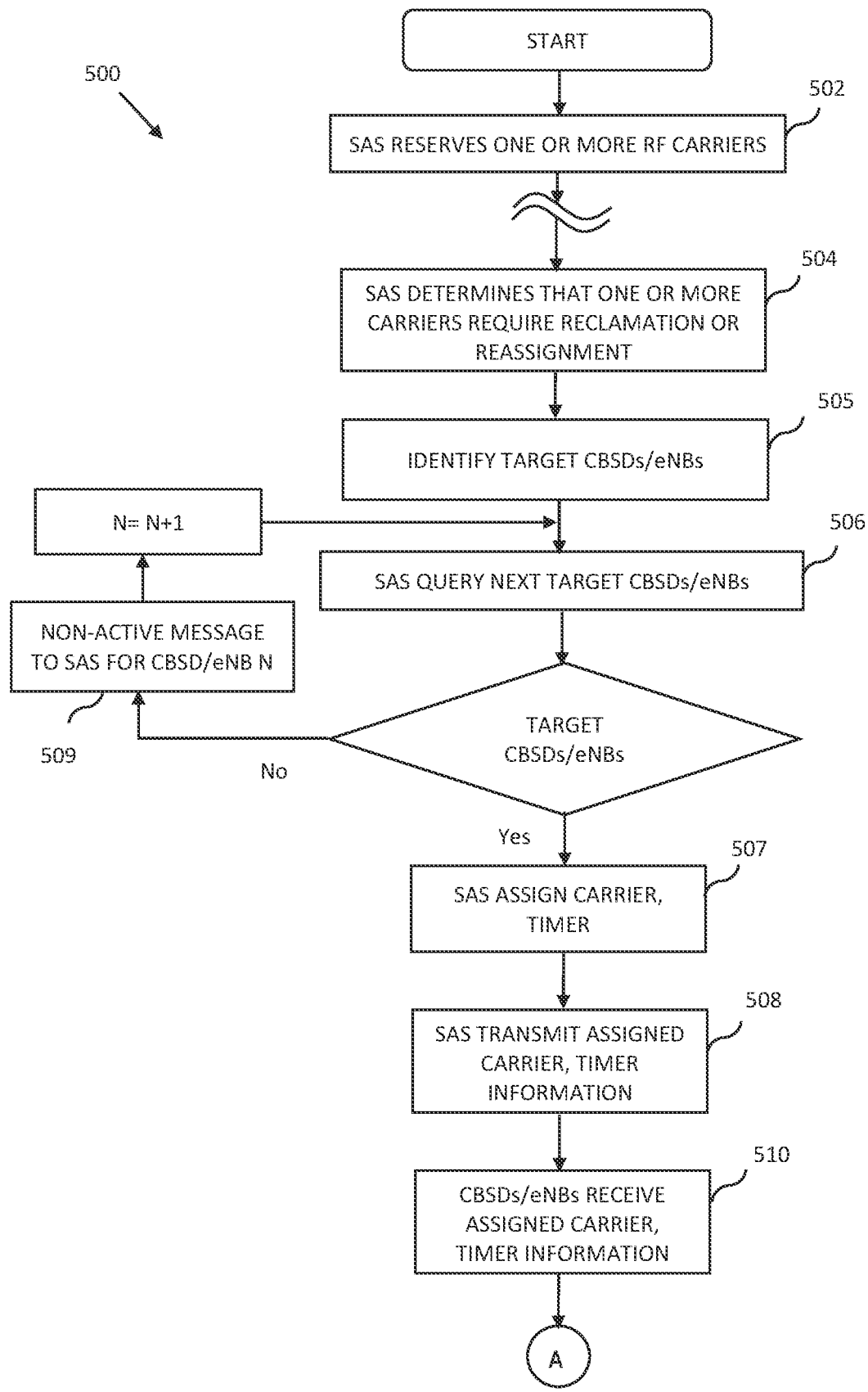
FIG. 5 is logical flow diagram of an exemplary generalized method for providing quasi-licensed band spectrum (e.g., CBRS GAA) seamless inter-cell frequency reassignments according to the present disclosure.
Figure 5:
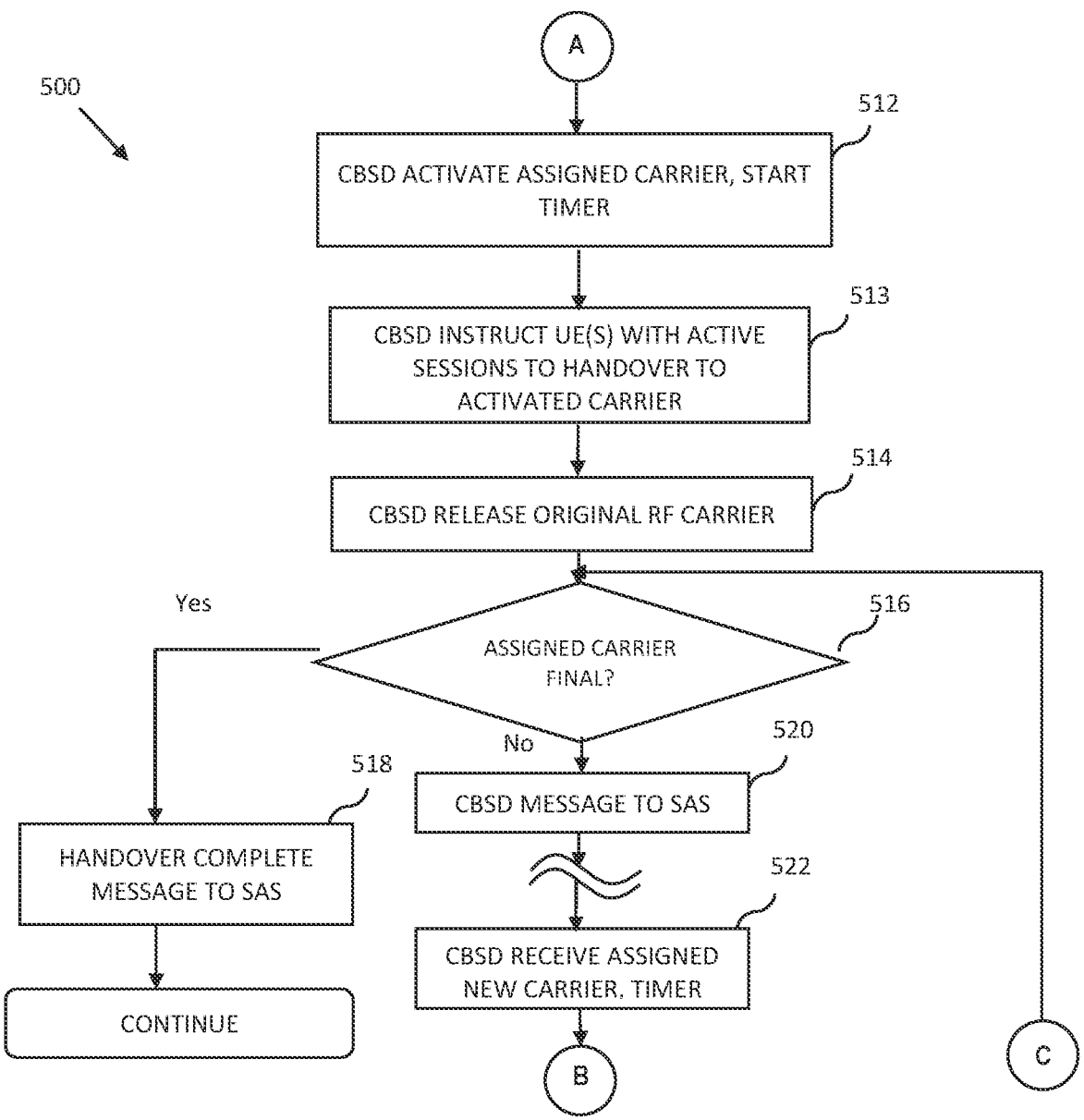
Figure 5:
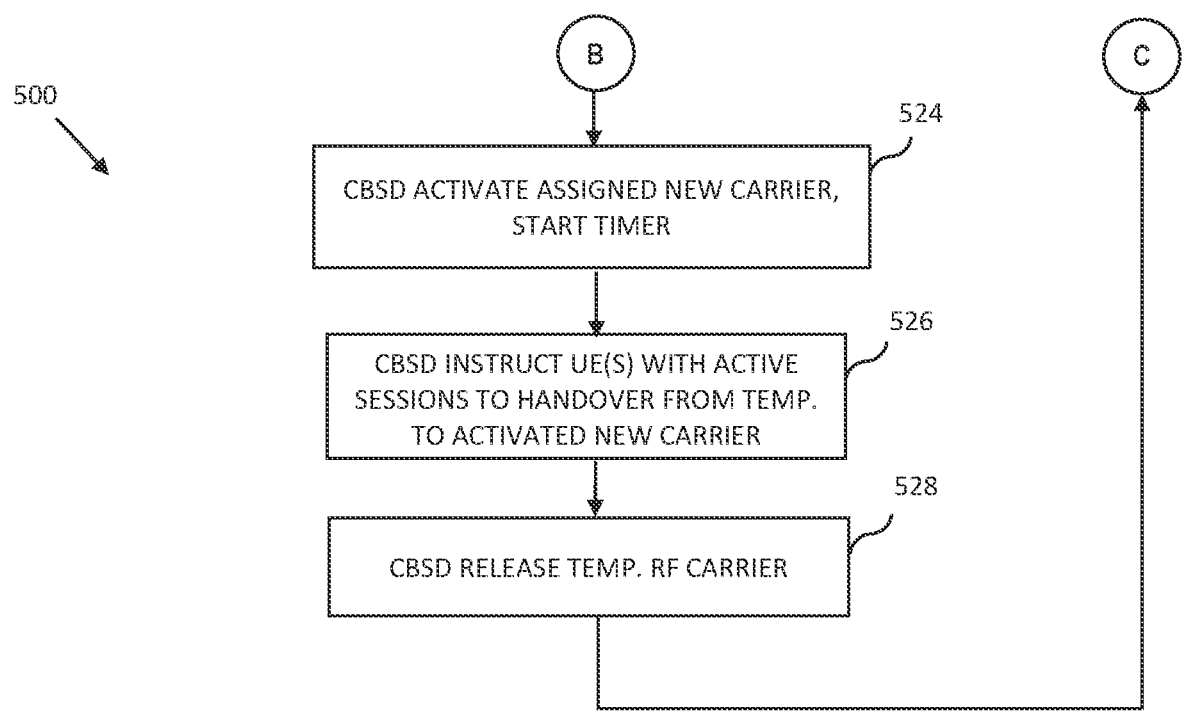
Figure 5A:
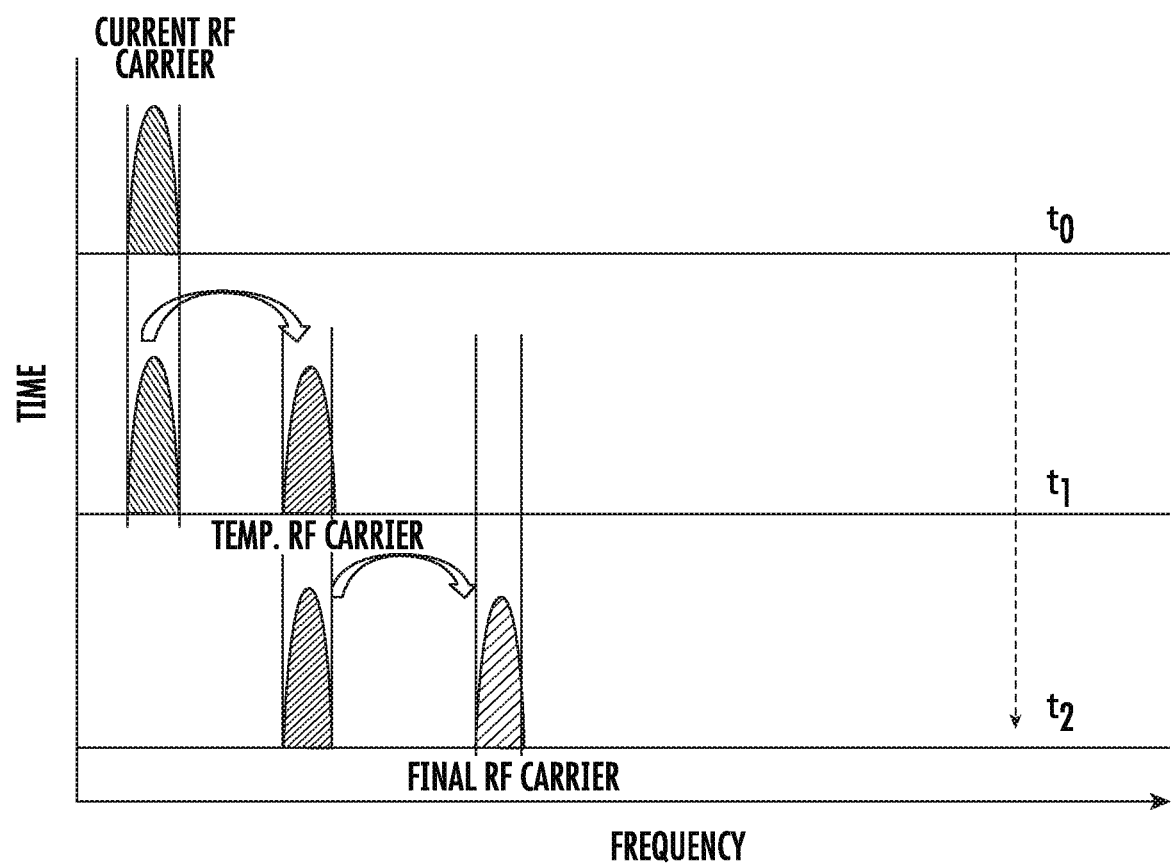
FIG. 5a is a graphical representation of the frequency reassignment methodology of FIG. 5, wherein one or more temporary frequencies are utilized.

Referring now to FIG. 5, one embodiment of the general methodology 500 of "seamless" spectrum/sector reassignment according to the present disclosure is shown and described, in the exemplary context of a CBRS-based system with SAS/CBSDs as previously described.

As discussed above, the CBSD(s) may interface with the host SAS directly, or via one or more interposed entities such as computerized domain proxy (DP) entities 408. For the purposes of illustration, it will be assumed that each of the registering CBSDs is/are associated with a common network operator (NO) domain, although this is not a requirement for practicing the method 500.

At step 502 of the method 500, the SAS reserves one or more RF carrier (s) defined based on the network load (e.g., 1 for high load so as to reduce "wasted" reserved bandwidth, and a prescribed value such as F_temp_max for low load) to be used as assisting in the intra-cell, inter-frequency handoff.

Per step 504, the SAS determines that one or more RF carriers require reclamation or reassignment, such as based on incumbent detection or other conditions.

Per step 505, the SAS (or designated proxy, such as the DP 408 or even the MSO controller 310) conducts an evaluation of extant CBSDs within the affected area to identify one or more target CBSDs which will invoke the intra-cell, inter-frequency handover process.

In the exemplary embodiment, the SAS has knowledge of the individual channels (both GAA and PAL) in a given region, and the identities of the CBSDs to which a given channel is assigned. In situations where there is need for revocation of a given channel (e.g., due to incumbent needs), the SAS need to identify the impacted CBSDs. Note that the revocation may be applicable only to a particular geographic region, and hence only a subset of CBSDs may need to relinquish the channel needed by some incumbent. The SAS having knowledge of both (i) the information regarding the channel needed by an incumbent, and (ii) the affected region, enables identification of CBSDs which are required to relinquish their assigned channel.

At step 506, when the SAS decides to either change an extant RF carrier or reconfigure it for a target CBSD (s) under consideration, the SAS queries the target CBSD(s) whether it is carrying traffic or not (e.g., via a protocol message sent from the SAS to the target CBSD via the DP or directly if no DP present). In one alternate embodiment, the DP may be configured to issue the protocol message as a proxy for the SAS (i.e., the SAS invokes the DP to generate and transmit the message to the target CBSD(s), and likewise generate a message relating to the CBSD reply for transmission from the DP back to the SAS).

Per step 507, once the CBSD(s) respond back with a positive indication of traffic (via protocol message), the SAS assigns a time (from the timer, discussed below) and an RF carrier (number and size depends on the active uses on the current CBSD(s) channels), and per step 508, communicates to the target CBSD(s) to activate the carrier and start the timer. If the target CBSD/eNB queried does not have active traffic on the carrier, then per step 509 a message is sent to the SAS to that effect (query response), and the next CBSD/eNB in the target list (i.e., N+1) queried.

It is noted that as part of the communication of step 508, the SAS may also indicate to the target CBSD whether the provided RF carrier is the "final" RF carrier as well, or merely a temporary or ephemeral carrier to be used for the transition only. This may be accomplished either by inclusion of information in the protocol message (e.g., an IE specifying the RF carrier status or condition), or the absence of data (e.g., where no IE is provided or the IE is empty, the CBSD can infer that the RF carrier is of one type or the other).

As referenced above, the SAS defines a timer parameter that is given to affected CBSD(s) to be used to complete the intra-cell and inter-frequency handover within the time defined by the timer parameter. For instance, as part of the protocol communication of step 508, the SAS may utilize a defined IE (information element) present in a configuration or status message, with the value of the timer specified. For example, in one variant, the SAS and CBSDs continuously exchange Heartbeat (HB) messages to maintain the status of the allocated channels, perform "health" checks, etc. These messages may also be used by a SAS to terminate a grant/revoke previously granted channel. In one implementation, an IE is added to the HB message to enable the SAS to provide data including: (i) data indicating one or more alternate channels to be utilized; (ii) data indicative of whether the channel is temporary or permanent; and (iii) data indicating duration of the grant for the alternate channel (s) provided.

It will be appreciated that other methods for signaling the presence or absence of active traffic being carried by the target CBSD(s)—i.e., other than a "message/response" protocol—may be used consistent with the disclosure. For example, in one variant, passive determination is used, such as where the CBSD(s) maintain updated UE/carrier data in a database which is either directly or indirectly accessible to the SAS or DP.

In another variant, the absence of periodic or other "heartbeat" messaging from a given CBSD relating to its status may indicate the lack of traffic; for example, a CBSD may be configured to "sleep" when inactive, and reduce or eliminate upstream message traffic during such periods. By determining that a status or heartbeat message has not been issued by the CBSD for a prescribed period of time, the SAS or DP can infer that the CBSD is inactive. Yet other approaches will be recognized by those of ordinary skill given the present disclosure.

Once the target CBSD(s) receive the timer data and frequency data (carrier number) per step 510, it proceeds to activate the RF carrier, start its local timer, and instruct all active users (e.g., UEs with active sessions) to perform an intra-cell, inter frequency handover to the specified channel per steps 512 and 513. Either at expiration of the local timer or upon completion of handing over active UEs to the specified RF carrier, the CBSD(s) releases the old (original) RF carrier per step 514, and determines whether the assigned RF carrier was permanent (final) or temporary per step 516. In one variant, the aforementioned IE data present in the protocol message is used to determine RF carrier status as temporary or final.

When the evaluation of step 516 indicates that the RF carrier was in fact final, the CBSD informs the SAS via a protocol message sent from the CBSD to the SAS (or to the DP, as discussed supra) of the completion of the transfer to the final carrier per step 518. The local timer may also be evaluated (not shown) to determine whether local time (e.g., a local CBSD/eNB value) exceeds the timer value parameter sent by the SAS; if so, an error message is generated and sent to the SAS or MSO controller 310.

When the evaluation of step 516 indicates that the RF carrier was not final, the CBSD awaits the receipt of the next RF carrier from the SAS (or DP) per step 522. As part of this procedure, the CBSD may inform the SAS via a protocol message sent from the CBSD to the SAS (or to the DP, as discussed supra) of the completion of the transfer to the temporary RF carrier (step 520); this can be used in one embodiment to trigger the SAS/DP to issue the protocol message with the next RF carrier of step 522.

When the CBSD receives the next RF carrier from the SAS/DP, it activate the new carrier in the cell (step 524), and performs the intra-cell inter-frequency handover from the temporary RF carrier to the new RF carrier per step 526, and release the temporary (last) carrier per step 528. The process then returns to step 516, wherein the finality of the handover process is again evaluated.

It is noted that in low load conditions (i.e., where extra RF frequencies exist), the temporary RF carrier assigned in step 508 may be the final RF carrier (as may be indicated by the SAS per the protocol message as described above). Conversely, "chains" using one or more temporary carriers may be employed, such as where there is a high load on a given CBSD. It will further be appreciated that the SAS/DP may utilize a "break before make" type logic where it causes a given CBSD to divorce itself from a given RF carrier (after the temporary carrier is activated), without knowledge of where the CBSD will be directed next in terms of frequency planning. As such, the SAS/DP may maintain a pool of temporary carrier for such purposes, and dynamically decide after each carrier transition where (in frequency) the next "hop" in the chain will terminate, based on then-prevailing conditions. This type of analysis may also be delegated to the MSO controller 310, the latter which may also reside at least partly within the CBSD itself. As such, the SAS/DP (or controller) may apply contention and/or arbitration mechanisms for the temporary carriers in its pool(s), between e.g., different CBSDs (whether within the same MSO service domain or other) so that temporary carriers (and even final carriers) are fairly allocated, and the number of handovers is minimized to the maximum degree practicable.

Alternatively, the SAS/DP may have planned out the complete chain of events for frequency migration/reassignment before invoking it at the target CBSD(s) per step 508. For instance, the SAS/DP may, via algorithmic analysis performed by the SAS/DP or a proxy process such as the MSO controller, generate a plan for all UE on a given CBSD (or more broadly, across multiple CBSD) such that (i) there are no "collisions" (e.g., two UE on the same RF carrier at the same time, whether temporarily or permanently), and (ii) that any withdrawn or otherwise unusable carriers are completely devoid of UE within the prescribed time limit. For instance, in one variant, the SAS/DP generates a protocol message to the MSO controller 310 to invoke generation of a frequency plan by the controller. In one implementation, the message includes a) the pool of available carriers, including for temporary use; and b) the current RF carriers to be relinquished. The MSO controller logic then uses this data to generate a "migration" plan for all UE on the target CBSD(s), including the chain of hops (i.e., F1 to F2 to F3 for UE1, F5 to F4 for UE2, and so forth) such that no collisions occur, and session continuity is maintained. This plan can be sent back to the SAS/DP per a response protocol message, and the plan approved and implemented by the SAS/DP, and subsequently implemented thereby via the signaling described previously.

Figure 6:
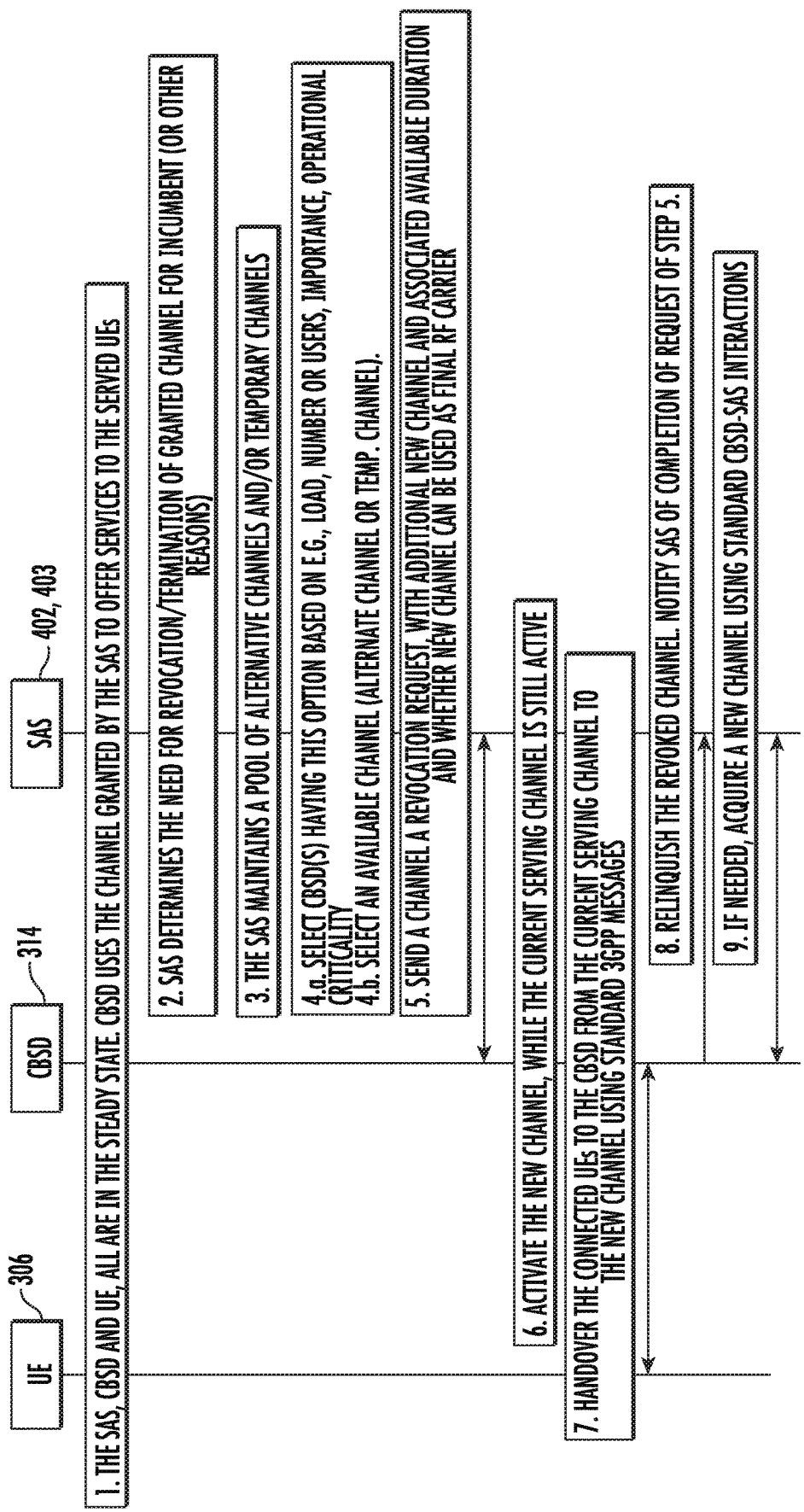
FIG. 6 is a ladder diagram illustrating an exemplary embodiment of a communication flow for quasi-licensed band seamless frequency reassignment transitions in accordance with the methods of the present disclosure.

FIG. 6 is a ladder diagram illustrating the exemplary communications flow for the methodology of FIG. 5, et seq.

Table 4 below illustrates one exemplary implementation of a protocol message useful in implementing the foregoing methodology in the context of a CBRS-based system. Specifically, Table 4 shows the construction of an OperationParam object useful in message exchanges between the SAS (or designated proxy) and CBSD/eNB.

TABLE 4

| Parameter | R/O/C | Description |
| --- | --- | --- |
| NAME: maxEirp<br>DATA TYPE: number | Required | Maximum EIRP permitted by the Grant. The maximum EIRP is in the units of dBm/MHz and is an integer with a value between −137 and +37 (dBm/MHz) inclusive.<br>The value of maxEirp represents the average (RMS) EIRP that would be measured per the procedure defined in FCC §96.41(e)(3). |
| NAME: operationFrequencyRange<br>DATA TYPE: object: FrequencyRange | Required | This parameter is the frequency range of a contiguous segment. |
| NAME: New TargetFrequencyRange<br>DATA TYPE: object: FrequencyRange | Optional | This parameter is present when the a new target channel is provided to a CBSD, that can be used by the CBSD in place of one or more channels being terminated. |
| NAME: New TargetChannelType<br>DATA TYPE: Number | Conditional | When a new target channel is provided the channel type is indicated (e.g., Temporary channel -1, Alternate -2, Final -3). |
| NAME: New TargetChannelDuration<br>DATA TYPE: Number | Conditional | When a new target channel is provided as temporary channel, the duration of availability in seconds (e.g., 30 . . . 300) is indicated. |

Figure 6A:
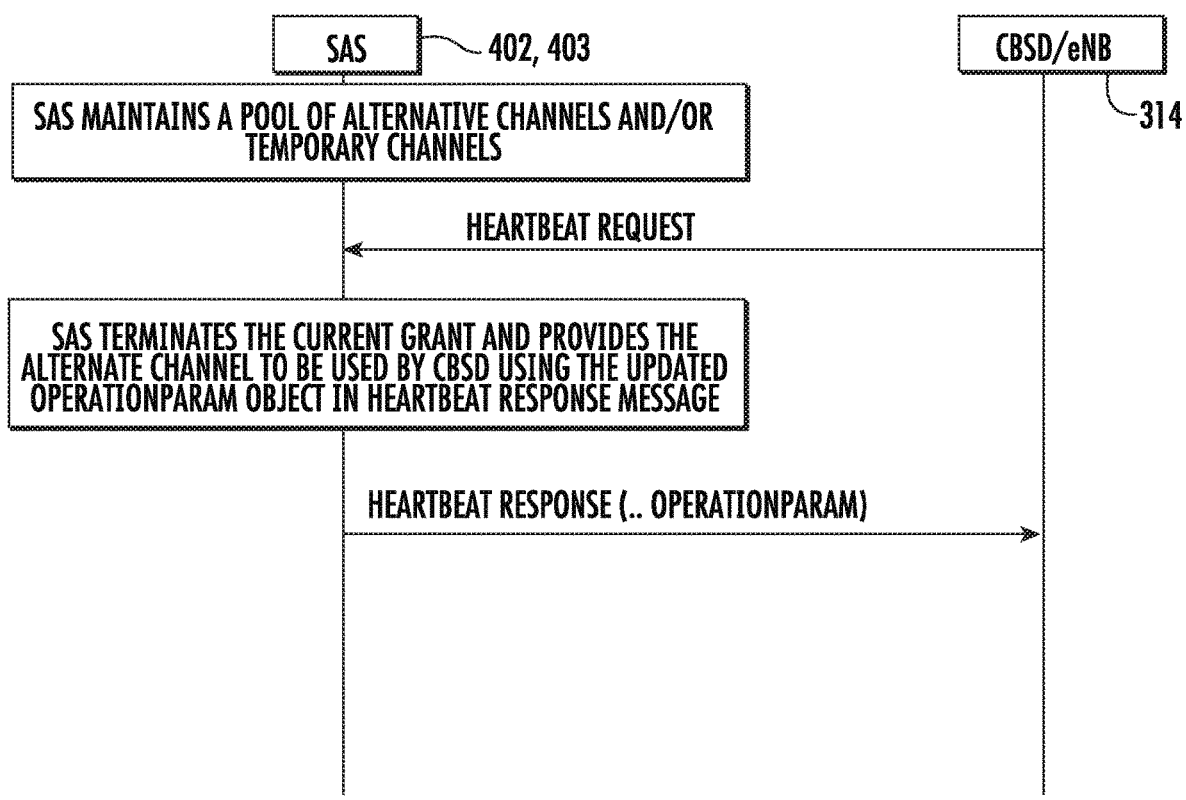
FIG. 6a is a ladder diagram illustrating an exemplary implementation of the communication flow of FIG. 6, wherein CBRS protocol "heartbeat" messages and responses are used as a basis of carrier reassignment.
Figures 1, 6A:
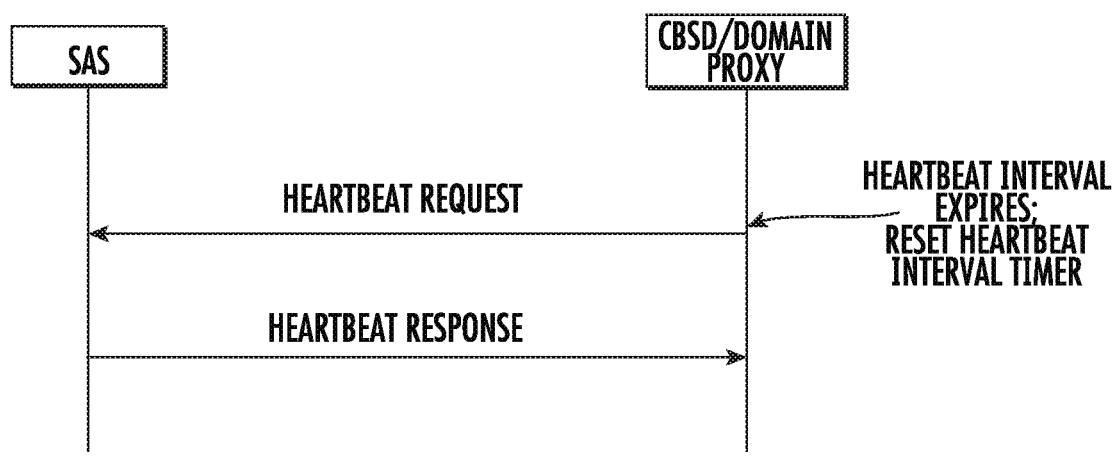

FIG. 6a graphically illustrates one exemplary mechanism for reassignment of RF carriers according to the disclosure. Specifically, as shown, the CBSD issues a "heartbeat request" (in the exemplary context of CBRS, a HeartbeatRequest object) which informs the SAS that the CBSD needs access to the allocated spectrum, and further can be used by the SAS to suspend or terminate a spectrum grant. This procedure is used by a CBSD when it has one or more grants in the "Granted" or "Authorized" states. If the transmit expiration timer expires prior to reception of a HeartbeatResponse object, the CBSD discontinues transmission for the grant within 60 seconds after the value of the transmitExpireTime parameter expires. If a given grant is suspended or terminated, the SAS has the option, within the HeartbeatResponse object, of instigating the CBSD to request alternative spectrum based on the operationParam object in the HeartbeatResponse object.

It is noted that under the extant system, an active Grant has a grantId and is not terminated, expired or relinquished, and the SAS to CBSD connectivity is not considered to be lost. However, when a grant is terminated, expires or is relinquished, or the SAS/CBSD connectivity is lost (i.e., no successful heartbeat procedure between the SAS and the CBSD for a period of time), its grantId is revoked and is no longer usable.

FIG. 6a-1 illustrates the extant (prior art) heartbeat request/response procedure graphically.

Returning to FIG. 6a, in the illustrated embodiment, the aforementioned heartbeat request/response architecture is leveraged such that when the SAS terminates a current grant, it further provides alternate RF carrier/channel information via the OperationParam object of the HeartbeatResponse object. In one implementation, this approach is used for both one or more temporary RF carriers, and the "final" carrier, although different mechanisms may be used for one or the other as described elsewhere herein (e.g., via messaging from a DP or even the MSO controller 310). Table 5 illustrates an exemplary CBRS-based HeartbeatResponse object (including OperationParam object of Table 4 above) useful with various embodiments described herein:

TABLE 5

| Parameter | R/O/C | Description |
|---|---|---|
| NAME: cbsdId<br>DATA TYPE: string | Conditional | This parameter is included if and only if the cbsdId parameter in the HeartbeatRequest object contains a valid CBSD identity. If included, the SAS shall set this parameter to the value of the cbsdId parameter in the corresponding HeartbeatRequest object. |
| NAME: grantId<br>DATA TYPE: string | Conditional | This parameter is included if and only if the grantId parameter in the HeartbeatRequest object contains a valid Grant identity. If included, the SAS shall set this parameter to the value of the grantId parameter in the corresponding HeartbeatRequest object. |
| NAME: transmitExpireTime<br>DATA TYPE: string | Required | The CBSD shall cease transmission using the SAS authorized radio resource within 60 seconds after the value of the transmitExpireTime parameter expires, in accordance with part 96.39(c)(2)). The transmitExpireTime is UTC time expressed in the format, YYYY-MM-DDThh:mm:ssZ.<br>The transmitExpireTime value shall be no later than the grantExpireTime. |
| NAME: grantExpireTime<br>DATA TYPE: string | Conditional | Required if the responseCode parameter indicates SUCCESS or SUSPENDED_GRANT or TERMINATED_GRANT and the grantRenew parameter was included and set to True in the corresponding HeartbeatRequest object. This parameter may be included at other times by SAS choice. |
| NAME: heartbeatInterval<br>DATA TYPE: number | Optional | This parameter is a positive integer and indicates the maximum time interval in units of seconds between two consecutive heartbeat requests. This parameter is included when the SAS wants to change the heartbeat interval. |
| NAME: operationParam<br>DATA TYPE: object:<br>OperationParam | Optional | If a heartbeat request is disapproved or the SAS intends to change the CBSD operation parameters (such as due to revocation or withdrawal of a channel), the SAS can provide a new set of operation parameters (see Table 4) to the CBSD using this object. |
| NAME: measReportConfig<br>DATA TYPE: array of string | Optional | The SAS uses this parameter to configure CBSD measurement reporting. The measurement report requested by the SAS shall be consistent with the CBSD measurement capabilities reported during the registration request. The CBSD shall report the measurement listed in this array. |
| NAME: response<br>DATA TYPE: object:<br>Response | Required | This parameter includes information on whether the corresponding CBSD request is approved or disapproved for a reason. |
| NAME: alternateChannel<br>DATA TYPE: object:<br>alternateChannelInfo | Conditional | Required if the responseCode parameter indicates SUSPENDED_GRANT or TERMINATED_GRANT AND the SAS intends to provide an alternate channel to the CBSD. |

In the exemplary embodiment, the response code value response attribute in the HeartBeatResponse message is used by the SAS to indicate its intent to terminate/suspend a grant. Exemplary response codes are listed in Appendix II hereto. The SAS may use TERMINATED_GRANT or SUSPENDED_GRANT to reclaim an existing active grant from the CBSD for any number of reasons, including e.g., incumbent movement. In one implementation, when the response code matches the above mentioned response code values, and the SAS intends to provide an alternate channel to the CBSD, the SAS may also include the grantExpireTime IE.

It will be appreciated that, depending on the timing of events, various protocol mechanisms within the CBRS architecture may be leveraged to implement the spectrum re-assignment functionality of the present disclosure. For example, where a CBSD sends a GrantRequest message (requesting spectrum from a SAS) or requests a renewal of an existing grant (e.g., per the HeartbeatRequest message grantRenew object), the SAS may concurrently determine that the requested spectrum is not available or is subject to revocation, and respond with a new RF carrier assignment. In the case where the CBSD is already using one or more carriers requiring revocation/withdrawal, then the SAS can invoke the revocation/reassignment process as described elsewhere herein, including via use or inclusion of an appropriately configured OperationParam object.

Moreover, the OperationParam object can be part of a number of different other messages. For instance this object may be included in the proposed alternateChannelInfo object (see Table 6), thereby enabling a SAS to provide a CBSD with the operational characteristics for the new channel being allocated to the CBSD.

reclaimed/reassigned in active use (i.e., used by one or more UE 306). This may be accomplished via any number of means, including via UE measurement messages sent to the CBSD via active Sector S1. For example, a serving cell/sector can provision the thresholds for one or more UE(s) served by the cell/sector, and the UE provides the measurements to cell/sector. Moreover, the serving cell can "tune" thresholds associated with these measurements and effectively steer the UE towards the desired target cell.

Next, the CBSD/eNB identifies a new or target sector (S2) and frequency (F2) associated therewith per step 706. As used in this context, the term "new or target" refers to, inter alia, temporary or final frequencies; i.e., the target may be merely part of a "hop" sequence or plan, or may in fact be the (then) final frequency on which the UE will operate for at least a period of time without further hop. This identification of step 706 may be conducted by the CBSD/eNB alone, or based at least in part on information from the SAS/DP (e.g., from OpertionParam object as previously described). In one embodiment, the CBSD/eNB is configured to determine which sectors are available for the handover.

TABLE 6

| Parameter | R/O/C | Description |
| --- | --- | --- |
| NAME: cbsdId<br>DATA TYPE: string | Required | This parameter is the cbsdId contains a valid CBSD identity. |
| NAME: grantId<br>DATA TYPE: string | Required | An ID provided by the SAS for this Grant. Included: If and only if the Grant request is approved by the SAS.<br>The CBSD shall set the Grant identity for this Grant to the value received in this parameter. |
| NAME: grantExpireTime<br>DATA TYPE: string | Required | The grantExpireTime indicates the time when the Grant associated with the grantId in this Heartbeat Response expires. This parameter is UTC time expressed in the format, YYYY-MM-DDThh:mm:ssZ. |
| NAME: alternateChannelType<br>DATA TYPE: number | Required | Type of alternate channel provided, permanent or temporary |
| NAME: heartbeatInterval<br>DATA TYPE: number | Conditional | This parameter is a positive integer and indicates the maximum time interval in units of seconds between two consecutive heartbeat requests. This parameter is included only if the alternateChannelType allocated is a permanent one. |
| NAME: measReportConfig<br>DATA TYPE: array of string | Optional | The SAS uses this parameter to configure CBSD measurement reporting. The measurement report requested by the SAS shall be consistent with the CBSD measurement capabilities reported during the registration request. The CBSD shall report the measurements listed in this array.. |
| NAME: operationParam<br>DATA TYPE: object:<br>OperationParam | Optional | SAS can optionally provide a new set of operation parameters to the CBSD for use in a new Grant request. |

Figure 7:
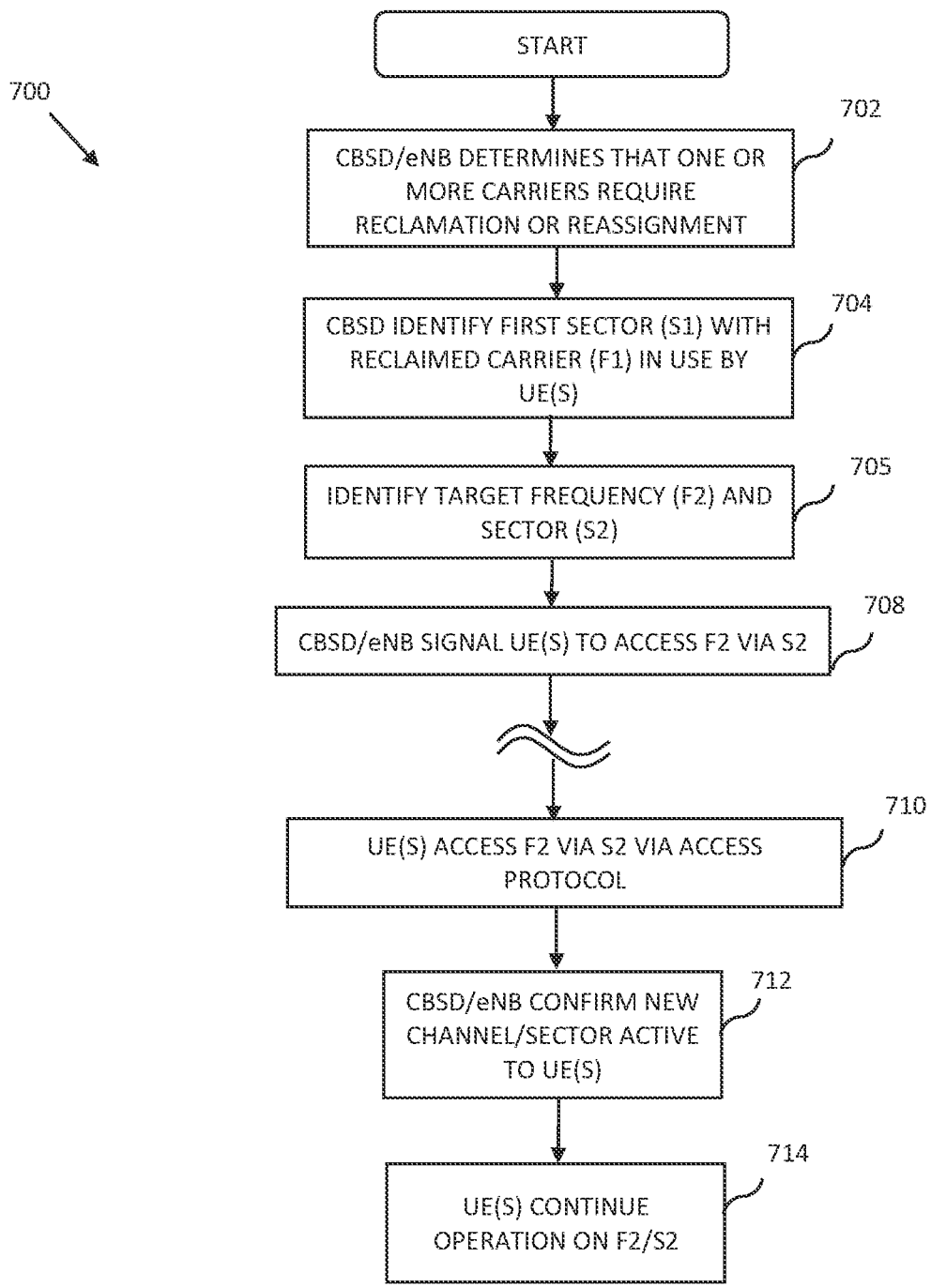
FIG. 7 is logical flow diagram of an exemplary embodiment of a method for providing quasi-licensed band spectrum (e.g., CBRS GAA) inter-cell sector and frequency reassignments according to the present disclosure.

Referring now to FIGS. 7-7b, one embodiment of the methodology 700 of seamless intra-cell sector and frequency reassignment according to the disclosure is described in detail.

As shown in FIG. 7, the method 700 includes a CBSD/eNB first determining that one or more carrier frequencies require withdrawal or reassignment per step 702. For instance, in one variant, the SAS 402, 403 communicates this information via one or more CBRS protocol messages (whether by affirmative data, failure to renew a grant, or other means, as described supra).

Next, per step 704, the CBSD/eNB 314 identifies a first sector (S1) having the one or more RF carriers to be Network planning is utilized to provide coverage for a given geographic region. Ideally, coverage is preserved across any channel (frequency) change. In reality, coverage during channel changes may be different, but the specified operational configuration should attempt to preserve as much of the original coverage as possible across the channel change. The new sector (S2) with the new channel (F2) should accordingly provide service to all UEs previously served using the prior channel (F1) to the greatest degree practicable.

Next, per step 708, the CBSD/eNB 314 signals the affected UE(s) 306 to cause them to invoke an access protocol on the newly identified sector/carrier (S2/F2). In one embodiment, the signaling advantageously leverages extant 3GPP RRC Connection Reconfiguration messaging protocols now utilized ubiquitously by LTE-enabled mobile devices. Specifically, the CBSD/eNB instructs, via the first sector array S1, the UE(s) to reconfigure their connection and invoke a RACH (random access channel) procedure by which the UE can obtain the new sector/carrier (S2/F2). Logic within the CBSD/eNB, as shown in FIG. 7a, communicates the new (F2) channel assignment to S2, such that the logic within the S2 radio chain responds to the UE RACH request with F2 (as opposed to some other carrier of its own choosing). It is noted in passing that in the illustrated embodiment, since S1 and S2 are under common association with the CBSD/eNB invoking the handover, the RACH procedure is "contention free" versus (contention based), as the UE already has an active RRC connection. As such, the time necessary for the CBSD/eNB to service and establish a new RRC Connection on F2/S2, via the S2 array, is advantageously very low.

Moreover, since an intra-eNB handover is utilized in the illustrated embodiment, so there is no impact to an existing data session anchored in the core. In comparison, inter-eNB S1/X2 based handovers specified in 3GPP (LTE) provide session continuity and minimize disruption to data (e.g. transferring packets over X2 between two eNBs, and re-sequencing them, using end marker packets etc.); however the intra-eNB handover described herein is significantly more robust compared to inter-eNB scenario.

Notably, in LTE, an idle mode UE does not have context in the eNB. Accordingly, this scenario can be addressed differently; e.g., by forcing the UE to perform idle mode cell reselection, and switch to the new channel.

It will further be appreciated that the 3GPP (LTE) standards provide two modes for a Random Access (RACH) procedure, specifically: (i) non-contention based, and (ii) contention-based. The contention-based approach can be used any time for normal attach/handover etc.; however, the contention-free (non-contention based) approach can be used only during handover. Moreover, the contention-free approach can be used for both intra-eNB and inter-eNB handovers. Within the contention-free Random Access procedure, the serving cell provides the UE with the pre-amble in the target cell under both intra-eNB and inter-eNB handovers. This functionality further optimizes the handover process but as will be recognized, is purely optional under the various aspects disclosed herein.

CBSD/eNB Apparatus—

Figure 8:
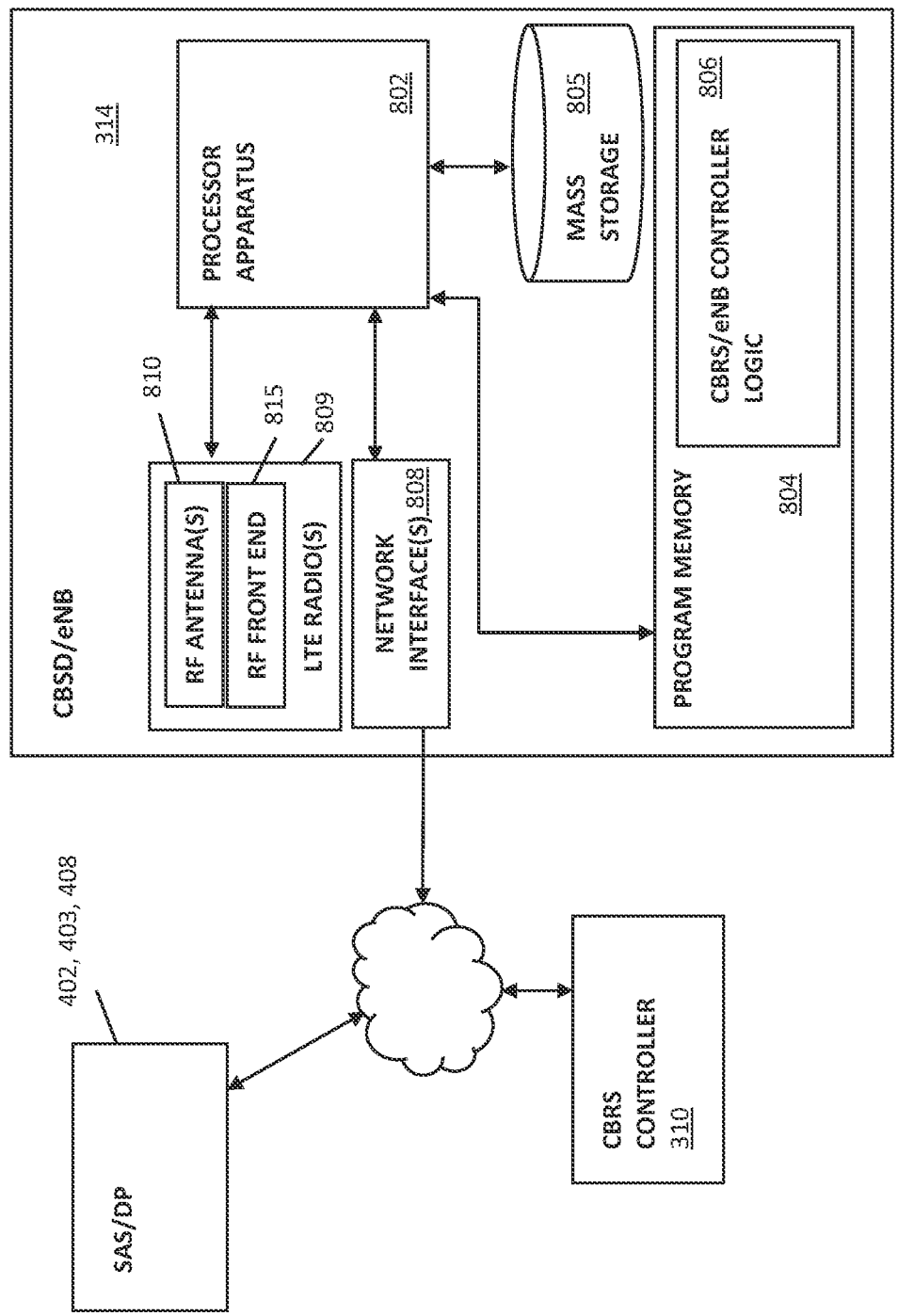
FIG. 8 is a functional block diagram illustrating an exemplary embodiment of a Citizens Broadband radio Service Device (CBSD) and eNodeB (eNB) apparatus according to the present disclosure.

FIG. 8 illustrates an exemplary CBSD/eNB access node 314 according to the present disclosure. As shown, the CBSD/eNB 314 includes, inter alia, a processor apparatus or subsystem 802, a program memory module 804, mass storage 805, a CBRS/eNB controller logic module 806, one or more network (e.g., SAS/DP, controller 310a and LAN) interfaces 808, as well as one or more radio frequency (RF) devices 809 having, inter alia, antenna(e) 810 and one or more RF tuners 815.

At a high level, the exemplary CBSD/eNB 314 of FIG. 8 maintains in effect two "stacks"; (i) a CBRS-compliant stack for communication of the CBSD/eNB (acting as a CBRS-compliant entity) with other CBRS entities such as SAS/DP, according to e.g., the Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety; and (ii) a 3GPP-compliant LTE/LTE-A/5G NR "stack" for CBSD/eNB (acting as a EUTRAN eNB) communications with 3GPP-compliant UEs (mobile devices 306). As described in greater detail below, these two stacks are implemented and controlled via the controller process (logic) 806 of the CBSD/eNB 314 such that CBSD/eNB-to-SAS communication protocols and CBSD/eNB-to-UE protocols are used in a coordinated fashion to enhance session continuity and perform the seamless handover functionality previously described.

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The RF antenna(s) 810 are configured to detect and transceive signals from radio access technologies (RATs) in the service area or venue with which the CBSD/eNB is associated. For example, LTE (including, e.g., LTE, LTE-A, LTE-U, LTE-LAA) signals may be used as the basis of communication between the CBSD/eNB 314 and the various mobile devices (e.g., UEs) being served. The antenna(s) 810 may include multiple spatially diverse individual elements in e.g., a MIMO- or MISO-type configuration, such that spatial diversity of the transceived signals can be utilized.

In the exemplary embodiment, the radio interface(s) comprise one or more LTE-based radios compliant with 3GPP. Additional unlicensed, licensed, or quasi-licensed air interfaces may also be used within the CBSD/eNB, including e.g., Wi-Fi, non-CBRS band LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As such, the various aspects of the present disclosure can be readily adapted for use within the 5G NR context, including use of a CBSD/gNB, and associated CU/DU functionality and "splits" to implement the seamless handover functions described herein.

The tuner 815 in one embodiment comprises a digitally controlled RF tuner capable of reception of signals via the RF front end (receive chain) of the LTE radio 809 in the aforementioned bands, including in one variant simultaneous reception (e.g., both 2.300 to 2.500 and 3.550 to 3.700 GHz bands at the same time).

The processing apparatus 802 is configured to execute at least one computer program stored in memory 804 (e.g., a non-transitory computer readable storage medium); in the illustrated embodiment, such programs include logic to implement the seamless inter-frequency, intra-cell handover logic and inter-sector handover logic described previously herein. Other embodiments may implement such functionality within dedicated hardware, logic, and/or specialized co-processors (not shown).

In some embodiments, the controller logic program 806 utilizes memory 804 or other storage 805 configured to temporarily hold a number of data reports or files before transmission via the backend interface(s) 810 to the SAS 402, 403, DP 408, and/or CC 310. In other embodiments, application program interfaces (APIs) such as those included in an MSO-provided application or those natively available on the CBSD/eNB (e.g., as part of the computer program noted supra or associated with the controller logic 806) may also reside in the internal cache or other memory 804. Such APIs may include common network protocols or programming languages configured to enable communication between the CBSD/eNB and SAS/DP, and/or CC 310 and other network entities as well as use procedures for collecting, compressing and/or parsing information obtained via the antenna(s) 808 and radio 809. Data stored may relate for example to prescribed 3GPP or CBRS reporting from the UEs (e.g., measurement report data, RSSI, active applications operative on a given UE for purposes of evaluating session activity/currency, etc.) such that a receiving device (e.g., SAS/DP, controller 310, or other EUTRAN entity) may interpret the reports in order to extract and analyze the relevant information.

SAS Apparatus—

Figure 9:
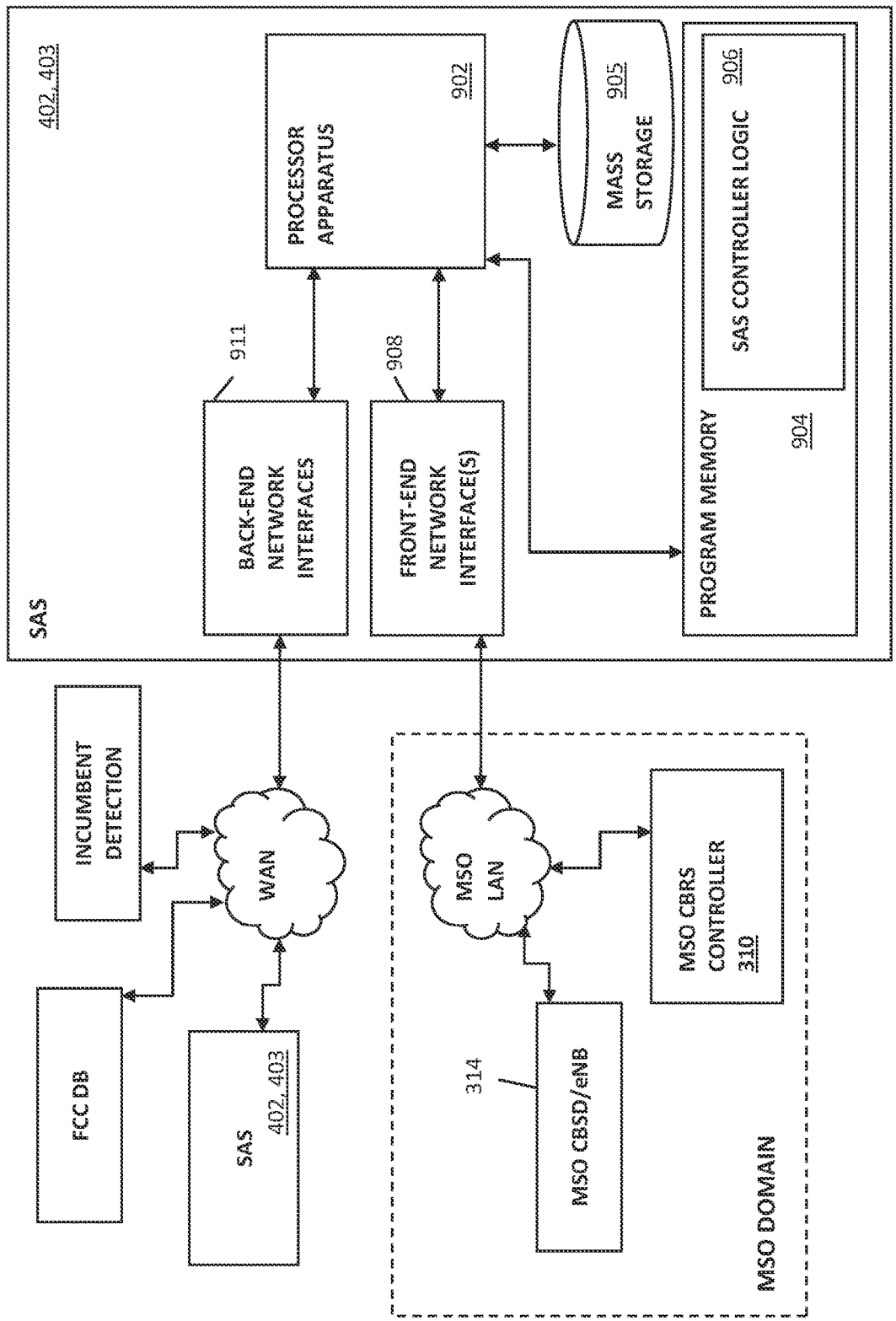
FIG. 9 is a functional block diagram illustrating one embodiment of an exemplary Spectrum Access System (SAS) device according to the present disclosure.

FIG. 9 illustrates an exemplary SAS apparatus (e.g., SAS 402, 403 such as an FSAS and/or CSAS) configured according to the present disclosure. As shown, the SAS 402, 403 includes, inter alia, a processor apparatus or subsystem 902, a program memory module 904, mass storage 905, SAS controller logic module 906, one or more front end network interfaces 908 for communication with e.g., CBSD/eNB, DP (if any), the MSO controller 310 and LAN, as well as one or more back end interfaces 911 for communicating with other SAS, incumbent and detection entities, and FCC processes (see FIG. 4).

In the exemplary embodiment, the processor 902 may include one or more of a digital signal processor, microprocessor, field-programmable gate array, or plurality of processing components mounted on one or more substrates. The processor 902 may also comprise an internal cache memory, and is in communication with a memory subsystem 904, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 902.

The processor 902 is configured to execute at least one computer program stored in memory 904 (e.g., a non-transitory computer readable storage medium); in the illustrated embodiment, such programs include logic to implement the RF carrier pool maintenance and migration logic described previously herein. Other embodiments may implement such functionality within dedicated hardware, logic, and/or specialized co-processors (not shown).

The CBRS stack of the SAS is implemented and controlled via the controller process (logic) 806 of the SAS such that CBSD/eNB-to-SAS communication protocols are used to enhance session continuity and perform the seamless handover functionality previously described, including SAS functions such as (i) temporary RF carrier pool management, and (ii) coordination with the MSO controller (if any) 310 such as for RF carrier migration plan generation, etc. as previously described herein. The SAS may also maintain data on multiple CBSD/eNB devices, whether on an individual basis, per-domain basis (e.g., all CBSD/eNBs for a given MSO), or both, so as to facilitate "controlled" migration of RF carriers due to e.g., grant withdrawal or revocation.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computer readable apparatus comprising a non-transitory storage medium, the non-transitory storage medium comprising at least one computer program having a plurality of instructions, the plurality of instructions configured to, when executed on a processing apparatus, cause a computerized wireless access node apparatus to:

determine that one or more radio frequency (RF) carriers require at least one of (i) reclamation or (ii) reassignment;

identify a first wireless sector having the one or more RF carriers then-currently in use by at least one computerized wireless-enabled mobile device;

identify a second wireless sector and a target RF carrier associated therewith;

transmit first data to the at least one computerized wireless-enabled mobile device via use of the one or more RF carriers, the transmitted first data configured to cause the at least one computerized wireless-enabled mobile device to access, via an access protocol, the target RF carrier via the second wireless sector; and transmit second data to the at least one computerized wireless-enabled mobile device via the target RF carrier, the second data confirming availability of the target RF carrier for use via the second wireless sector.

2. The computer readable apparatus of claim 1, wherein the identification of the first wireless sector having the one or more RF carriers then-currently in use by the at least one computerized wireless-enabled mobile device comprises receipt, via the first wireless sector, of reporting data from the at least one computerized wireless-enabled mobile device, the reporting data configured to report data relating to the one or more RF carriers.

3. The computer readable apparatus of claim 2, wherein:
the plurality of instructions are further configured to, when executed on the processing apparatus, cause the computerized wireless access node apparatus to:
transmit and receive RF waveforms in a quasi-licensed portion of an RF spectrum via a CBSD (Citizens Broadband Radio Service Device) that is configured to utilize a CBRS-compliant spectrum;
the computerized wireless access node apparatus comprises an eNodeB (EUTRAN evolved Node B); and
the receipt, via the first wireless sector, of the reporting data from the at least one computerized wireless-enabled mobile device comprises receipt of a 3GPP-compliant measurement report message from the at least one computerized wireless-enabled mobile device, the at least one computerized wireless-enabled mobile device comprising a 3GPP-compliant user equipment (UE) in radio frequency communication with the eNodeB.

4. The computer readable apparatus of claim 1, wherein the transmission of the first data to the at least one computerized wireless-enabled mobile device comprises transmission, via the first wireless sector, data configured to cause the at least one computerized wireless-enabled mobile device to reconfigure a connection thereof and invoke a RACH (random access channel) procedure by which the at least one computerized wireless-enabled mobile device can access the target RF carrier via the second wireless sector.

5. The computer readable apparatus of claim 1, wherein:
the plurality of instructions are further configured to, when executed on the processing apparatus, cause the computerized wireless access node apparatus to:
receive data from a computerized network entity, the received data configured to cause the computerized wireless access node apparatus to invoke a handover procedure.

6. The computer readable apparatus of claim 1, wherein:
the plurality of instructions are further configured to, when executed on the processing apparatus, cause the computerized wireless access node apparatus to:
transmit and receive RF waveforms in a quasi-licensed portion of an RF spectrum via a CBSD (Citizens Broadband Radio Service Device) that is configured to utilize a CBRS-compliant spectrum;
the computerized wireless access node apparatus comprises an eNodeB (EUTRAN evolved Node B);
the transmission of the first data to the at least one computerized wireless-enabled mobile device comprises transmission of a 3GPP-compliant RRC (radio resource control) connection reconfiguration message; and
the transmission of the second data to the at least one computerized wireless-enabled mobile device comprises transmission of a 3GPP-compliant RRC connection reconfiguration complete message.

7. A computerized method for reassigning at least a portion of quasi-licensed wireless spectrum for a wireless access point apparatus, the computerized method comprising:
determining that one or more RF carriers require at least one of (i) reclamation or (ii) reassignment;
evaluating a plurality of RF carriers within a prescribed area to identify a substitute RF carrier with which to invoke a handover protocol;
transmitting data to the wireless access point apparatus, the transmitted data specifying (i) the substitute RF carrier and (ii) a timer value; and
determining that the wireless access point apparatus has invoked the handover protocol to transition from the one or more RF carriers to the substitute RF carrier before exceeding the timer value.

8. The computerized method of claim 7, wherein the evaluating of the plurality of RF carriers within the prescribed area to identify the substitute RF carrier is based at least on a determination that at least the substitute RF carrier is carrying traffic.

9. The computerized method of claim 7, wherein the transmitting of the data to the wireless access point apparatus comprises transmitting data to the wireless access point apparatus that indicates whether the substitute RF carrier is a final RF carrier or a temporary carrier to be used for a transition to the final RF carrier.

10. The computerized method of claim 9, further comprising maintaining data session continuity, the maintaining of the data session continuity comprising:
causing the wireless access point apparatus to de-activate the one or more RF carriers after activation of the substitute RF carrier so as to maintain continuity of at least one extant data session being carried over the one or more RF carriers; and
causing the wireless access point apparatus to de-activate the substitute RF carrier after the activation of the final RF carrier.

11. The computerized method of claim 7, wherein:
the wireless access point apparatus comprises a CBRS (Citizens Broadband Radio Service)-compliant access point; and
at least (i) the determining that the one or more RF carriers require the at least one of the reclamation or the reassignment, (ii) the evaluating, (iii) the transmitting, and (iv) the determining that the wireless access point apparatus has invoked the handover protocol, comprise utilizing a computerized SAS (Spectrum Access System) or a domain proxy (DP) associated therewith to perform each of (i), (ii), (iii) and (iv).

12. The computerized method of claim 11, wherein the wireless access point apparatus further comprises an eNodeB (EUTRAN evolved Node B), and the computerized method further comprises using 3rd Generation Partnership Project (3GPP)-compliant signaling to at least one user equipment (UE) in radio frequency communication with the eNodeB to (i) transfer to the substitute RF carrier, and (ii) thereafter transfer to a final RF carrier.

13. The computerized method of claim 7, wherein the determining that the wireless access point apparatus has invoked the handover protocol comprises receiving data indicating that the wireless access point apparatus completed the transition to the substitute RF carrier before exceeding the timer value.

14. The computerized method of claim 13, further comprising causing withdraw or reallocation of the one or more RF carriers based at least on the receiving of the data indicating that the wireless access point apparatus completed the transition to the substitute RF carrier before exceeding the timer value.

15. The computerized method of claim 7, wherein the evaluating of the plurality of RF carriers within the prescribed area comprises establishing a pool of available RF carriers, a size of the pool of the available RF carriers being based at least in part on data for a geographic region within which the wireless access point apparatus operates, the data indicating then-currently unused RF carriers.

16. The computerized method of claim 15, further comprising dynamically adjusting the pool of the available RF carriers during use of the handover protocol, the handover protocol used for inter-frequency, intra-cell handovers.

17. Computerized wireless access node apparatus configured for providing wireless access to a plurality of computerized wireless-enabled mobile devices via a quasi-licensed portion of a radio frequency (RF) spectrum, the computerized wireless access node apparatus comprising:
a wireless interface configured to transmit and receive RF waveforms in the quasi-licensed portion;
digital processor apparatus in data communication with the wireless interface; and
a storage device in data communication with the digital processor apparatus and comprising at least one computer program, the at least one computer program configured to, when executed by the digital processor apparatus, cause the computerized wireless access node apparatus to:
receive a first protocol message from a computerized network management entity, the first protocol message configured to cause the computerized wireless access node apparatus to determine an operational status of one or more RF carriers, the operational status relating to an existing data session on the one or more RF carriers;
receive a second protocol message from the computerized network management entity, the second protocol message configured to cause the computerized wireless access node apparatus to (i) activate a temporary RF carrier, and (ii) maintain the existing data session on at least the activated temporary RF carrier at least until activation of a final RF carrier;
deactivate the one or more RF carriers;
receive a third protocol message from the computerized network management entity, the third protocol message configured to cause the computerized wireless access node apparatus to (i) activate the final RF carrier, and (ii) maintain the existing data session on at least the activated final RF carrier; and
deactivate the temporary RF carrier;
wherein the activated temporary RF carrier is part of a hop sequence, and the activated final RF carrier comprises a carrier on which one or more of the plurality of computerized wireless-enabled mobile devices will operate for at least a period of time without further hop.

18. The computerized wireless access node apparatus of claim 17, wherein the at least one computer program is further configured to, when executed by the digital processor apparatus, cause the computerized wireless access node apparatus to:
generate and transmit a protocol message to the computerized network management entity indicating that the one or more RF carriers have been deactivated.

19. The computerized wireless access node apparatus of claim 17, wherein:
the wireless interface comprises a CBSD (Citizens Broadband Radio Service Device) that is configured to utilize a CBRS-compliant spectrum;
the computerized wireless access node apparatus further comprises an eNodeB (EUTRAN evolved Node B); and
the maintenance of the existing data session on at least the activated temporary RF carrier comprises use of 3GPP-compliant signaling to the one or more of the plurality of computerized wireless-enabled mobile devices, the one or more of the plurality of computerized wireless-enabled mobile devices comprising a 3GPP-compliant user equipment (UE) in radio frequency communication with the eNodeB, the 3GPP-compliant signaling to cause the 3GPP-compliant UE to transfer to the activated temporary RF carrier.

20. The computerized wireless access node apparatus of claim 17, wherein the at least one computer program configured to, when executed by the digital processor apparatus, cause the computerized wireless access node apparatus to:
generate a response to the first protocol message, the response based at least on the determined operational status.

21. The computerized wireless access node apparatus of claim 17, wherein the maintenance of the existing data session on at least the activated temporary RF carrier provides a temporary bridge for the one or more of the plurality of computerized wireless-enabled mobile devices between the one or more RF carriers and the final RF carrier.

* * * * *